United States Patent
Iyasu et al.

(10) Patent No.: US 9,391,472 B2
(45) Date of Patent: Jul. 12, 2016

(54) BATTERY CHARGING APPARATUS FOR VEHICLE

(71) Applicants: DENSO CORPORATION, Kariya (JP); NIPPON SOKEN, INC., Nishio (JP)

(72) Inventors: Seiji Iyasu, Anjo (JP); Shinji Andou, Nukata-gun (JP); Sadahisa Onimaru, Chiryu (JP); Kazuyoshi Obayashi, Chita-gun (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 622 days.

(21) Appl. No.: 13/624,049

(22) Filed: Sep. 21, 2012

(65) Prior Publication Data

US 2013/0069591 A1  Mar. 21, 2013

(30) Foreign Application Priority Data

Sep. 21, 2011  (JP) .................................. 2011-206327

(51) Int. Cl.
*H02J 7/00* (2006.01)
*H02J 7/14* (2006.01)

(52) U.S. Cl.
CPC ............. *H02J 7/1461* (2013.01); *H02J 7/1453* (2013.01); *Y02T 10/7005* (2013.01)

(58) Field of Classification Search
USPC ........................................................ 320/109
See application file for complete search history.

(56) References Cited

U.S. PATENT DOCUMENTS

| 5,982,152 | A | * | 11/1999 | Watanabe et al. | 320/150 |
| 2009/0198438 | A1 | * | 8/2009 | Jinno | 701/110 |
| 2012/0216983 | A1 | * | 8/2012 | Bennion et al. | 165/41 |
| 2012/0297809 | A1 | * | 11/2012 | Carpenter | 62/244 |
| 2012/0326663 | A1 | * | 12/2012 | You et al. | 320/109 |

FOREIGN PATENT DOCUMENTS

| JP | 11-350956 | 12/1999 |
| JP | 2007-195336 | 8/2007 |
| JP | 2009-033901 | 2/2009 |
| JP | 2009-222009 | 10/2009 |
| JP | 2010-068623 | 3/2010 |

OTHER PUBLICATIONS

U.S. Appl. No. 13/448,524, of Onimaru et al., filed Apr. 17, 2012.
Office Action (2 pages) dated May 28, 2013, issued in corresponding Japanese Application No. 2011-206327 and English translation (2 pages).
Office Action (1 page) dated Oct. 15, 2013, issued in corresponding Japanese Application No. 2011-206327 and English translation (1 page).

* cited by examiner

*Primary Examiner* — Eric Lee
(74) *Attorney, Agent, or Firm* — Nixon & Vanderhye P.C.

(57) ABSTRACT

A battery charger of a battery charging apparatus is disposed on an exterior case of an engine in such a manner that a generated heat is transferred therebetween. An ECU drives a cooling system when an engine temperature and temperature of the battery charger satisfy a predetermined cooling temperature condition. A cooling capacity for cooling the battery charger is improved by establishing a heat radiation passage to radiate a heat from the battery charger efficiently.

10 Claims, 18 Drawing Sheets

BATTERY CHARGING APPARATUS FOR VEHICLE

CROSS-REFERENCE TO RELATED APPLICATION

This application is based on Japanese Patent Application No. 2011-206327 filed on Sep. 21, 2011, the disclosure of which is incorporated herein by reference.

TECHNICAL FIELD

The present disclosure relates to a battery charging apparatus for a vehicle, which is capable of cooling a battery charger. The battery charger charges utility power to a storage battery.

BACKGROUND

JP-2009-222009A shows an electrically-driven compressor provided with an inverter unit on its housing. The inverter unit is comprised of an inverter cover, a drive circuit, and a cooling plate. The inverter cover covers the drive circuit and the cooling plate. The cooling plate is arranged so that its outer surface confronts the housing. A switching element of the drive circuit is disposed on the cooling plate. A refrigerant passage is formed between a groove of the housing and the cooling plate.

The refrigerant flows in S-shaped refrigerant passage formed in the housing. Then, the refrigerant flows into the compressor and is compressed. The switching element, which generates heat, is cooled by the refrigerant flowing in the refrigerant passage through the cooling plate.

In a case of a battery charger, a plurality of switching elements is provided to the battery charger. Since the switching elements generate a lot of heat, it is necessary to cool the switching elements efficiently.

SUMMARY

It is an object of the present disclosure to provide a battery charging apparatus in which a cooling capacity for cooling the battery charger is improved by establishing a heat radiation path to radiate heat from the battery charger efficiently.

According to the present disclosure, a battery charging apparatus includes: a drive motor for driving the vehicle; an internal combustion engine for driving the vehicle; a storage battery charging an utility power for supplying an electric power to the drive motor; a battery charger controlling a power charging to the storage battery; a cooling system for cooling the engine; and an electronic control unit controlling the cooling system.

The battery charger is disposed on an exterior case of the engine in such a manner that a generated heat is transferred therebetween. The electronic control unit drives the cooling system for cooling the engine when a temperature of the engine or a temperature of the battery charger satisfies a predetermined cooling temperature condition.

A heat radiation path for cooling the battery charger is formed through the battery charger, the engine and the cooling systems. A heat generated by the battery charger is decreased by being transferred to the engine. A heat transfer path length for the battery charger is prolonged, whereby the battery charger is efficiently cooled. Furthermore, since the engine has a heat radiating area which is larger than that of the battery charger and the engine has the coolant circuit for its own sake, a large quantity of heat can be transferred from the battery charger to the engine.

According to another disclosure, a battery charging apparatus includes: a drive motor for driving the vehicle; a storage battery charging a utility power for supplying an electric power to the drive motor; a battery charger controlling a power charging to the storage battery; a cooling system for cooling the drive motor; and an electronic control unit controlling the cooling system.

The battery charger is disposed on an exterior case of the drive motor in such a manner that generated heat is transferred therebetween. The electronic control unit drives the cooling system to cool the drive motor when the temperature of drive motor or the temperature of the battery charger satisfy a predetermined cooling temperature condition.

The heat radiation path for cooling the battery charger is formed through the battery charger, the drive motor and the cooling systems. The heat generated by the battery charger is decreased by being transferred to the drive motor. A heat transfer path length for the battery charger is prolonged, whereby the battery charger is efficiently cooled. Furthermore, since the drive motor has a heat radiating area which is larger than that of the battery charger and the drive motor has the coolant circuit for its own sake, a large quantity of heat can be transferred from the battery charger to the drive motor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
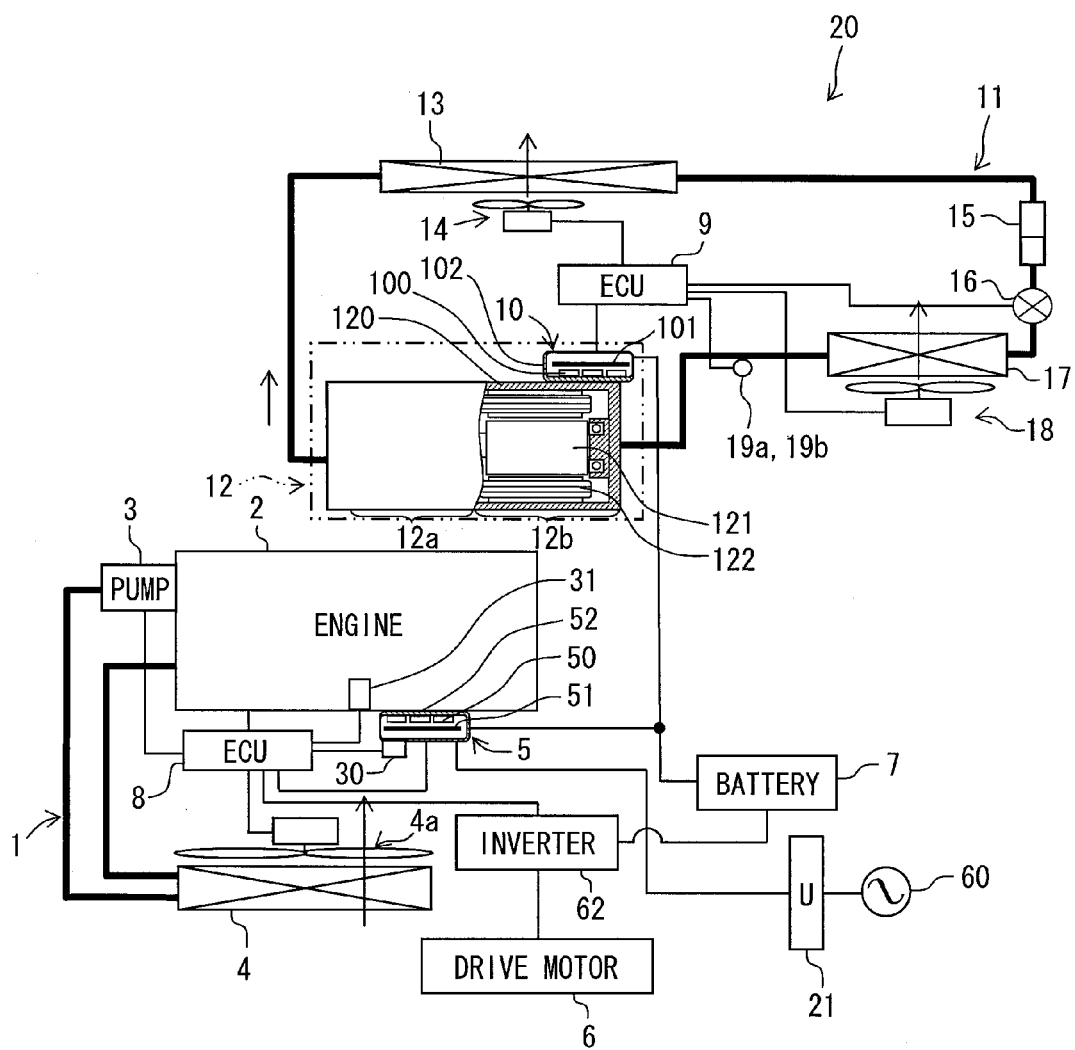
FIG. 1 is a schematic chart showing a battery charging apparatus according to a first embodiment.

Referring to drawings, embodiments of the present invention will be described hereinafter. In these embodiments, the same parts and components as those in each embodiment are indicated with the same reference numerals and the same descriptions will not be reiterated.

First Embodiment

Referring to FIGS. 1 to 4, a first embodiment of a battery charging apparatus 20 for a vehicle will be described. FIG. 1 is a schematic chart showing the battery charging apparatus 20.

The battery charging apparatus 20 is provided with a drive motor 6, which is an electric motor for driving a vehicle, a storage battery 7 for supplying electricity to electric components, and a battery charger 5. The battery charging apparatus 20 is mounted to a plug-in hybrid car or an electric motorcar. As shown in FIG. 1, the battery charging apparatus 20 is provided with an internal combustion engine 2, the drive motor 6, the storage battery 7, the battery charger 5, a cooling system, an electronic control unit (ECU) 8, and a refrigerant cycle 11 for air conditioning. The battery charger 5 of the battery charging apparatus 20 performs a charge-discharge control of the storage battery 7, and an operation control of the cooling system. Besides, the engine 2 drives the vehicle and also supplies electric power to the drive motor 6.

The storage battery 7 stores the utility power from a commercial power source 60, and supplies the electric power to the drive motor 6 and other electric components. The storage battery 7 is arranged in a passenger compartment other than an engine room. The storage battery 7 is a nickel hydrogen secondary battery, a rechargeable lithium-ion battery, or an organic radical cell. That is, the storage battery 7 is comprised of a plurality of battery cells. Charging and discharging of the battery cells can be controlled. Also, temperature of the battery cells can be controlled.

The storage battery 7 supplies electric power to an inverter 10 for driving an electrically-driven compressor 12 in the refrigerant cycle 11. When the storage battery 7 supplies electric power to electrical components, high voltage of the storage battery 7 is dropped to be charged in a low-voltage battery. The low voltage electric power is supplied to a fan, a headlight, an electric windshield wiper and the like from the low-voltage battery. A power receiving unit 21 receives electric power from the commercial power source 60. A power receiving unit 21 has a plug or a connector which is connectable to the commercial power source 60. The power receiving unit 21 is also connected to the battery charger 5.

The battery charger 5 controls the operation of the drive motor 6 and a charging to the storage battery 7. In a case of a hybrid car, the battery charger 5 supplies electric power to the drive motor 6 at a time of acceleration, and stores electricity in the storage battery 7 at a time of deceleration.

The battery charger 5 is disposed on an exterior case of the engine 2 in such a manner that generated heat is transferred therebetween. Specifically, the exterior case of the engine 2 and a case 52 of the battery charger 5 are in contact with each other. Alternatively, the exterior case of the engine 2 and the case 52 of the battery charger 5 are formed from one piece. The exterior case of the engine 2 and the case 52 of the battery charger 5 are made from heat-conductive material, such as aluminum, copper, iron and the like. Thus, thermal resistance between the battery charger 5 and the engine 2 is decreased. According to the above configuration, heat generated by the battery charger 5 is transferred to the engine 2 through the case 52 of a battery charger 5 and the exterior case of the engine 2.

In a case that the exterior case of the engine 2 and the case 52 of the battery charger 5 are formed separate pieces, heat conduction grease may be pasted therebetween to improve thermal conductivity.

The cooling system is comprised of a coolant circuit 1 through which engine coolant circulates to cool the engine 2, a water pump 3 which circulates the engine coolant in the coolant circuit 1, a radiator 4, and a radiator fan 4a. The electronic control unit (ECU) 8 controls the water pump 3 and the radiator fan 4a.

The ECU 8 may drive the radiator fan 4a to cool the engine 2 and the battery charger 5 without driving the water pump 3. In this case, only the radiator fan 4a constitutes the cooling system.

As above, the ECU 8 drives the cooling system when the engine temperature and temperature of the battery charger 5 satisfy a predetermined cooling temperature condition. The heat generated by the battery charger 5 is radiated to outside through the heat radiation path which is comprised of the case 52, the exterior case of the engine 2, the engine coolant, the cooling air passing through the radiator 4. In a case that the cooling air generated by the radiator fan 4a flows to the engine 2 directly, the heat generated by the battery charger 5 is radiated to outside through the heat radiation path which is comprised of the case 52, the exterior case of the engine 2.

The ECU 8 controls the engine 2, the cooling system, the battery charger 5 and the like. The ECU 8 includes a read only memory (ROM) and a random access memory (RAM) in which various control programs and maps are stored.

The battery charger 5 converts AC power supplied from the commercial power source 60 into direct current power to be charged in the storage battery 7. While an ignition switch or a start switch is off and the vehicle is stopped, the battery charger 5 charges the storage battery 7. When the ignition switch or the start switch is turned on, the drive motor 6 is controlled by an inverter unit 62. The drive motor 6 is energized to drive the vehicle. The inverter unit 62 is controlled by the ECU 8. The battery charger 5 is provided with a switching element 50 and the controlling circuit 51 which are accommodated in the case 52. The battery charger 5 is disposed on the exterior case of the engine 2 in such a manner as to directly receive the cooling air form the radiator fan 4a.

The switching element 50 is comprised of insulated gate bipolar transistors (IGBT). The switching element 50 has a plurality of switches. Based on an ON-OFF operation of the switches, the AC power from a commercial power source is changed into direct current power. Since the switching element 50 generates heat due to power loss, it is necessary to cool the switching element 50. The generated heat is transferred to the case 52 and the exterior case of the engine 2. The controlling circuit 51 is provided with various electronic parts of which operation depends on the switching element 50 and is controlled by the ECU 8.

A first temperature sensor 30 detects the temperature of the case 52 of a battery charger 5. The detected temperature signal is transmitted to the ECU 8. A second temperature sensor 31 detects the temperature of the exterior case of the engine 2. The detected temperature signal is transmitted to the ECU 8. Since a heat-conducting characteristic between the engine 2 and the battery charger 5 is kept favorable, the computer can determines whether it is necessary to cool the battery charger 5 by monitoring the detected temperature by the temperature sensors 30, 31.

The refrigerant cycle 11 is comprised of the electrically-driven compressor 12, the condenser 13, a receiver 15, the pressure reducer 16 which is an electric expansion valve and an evaporator 17. A second ECU 9 controls the inverter 10, a condenser fan 14, an evaporator fan 18, and the pressure reducer 16.

The electrically-driven compressor 12 suctions refrigerant from the evaporator 17. The suctioned refrigerant is compressed in the compression mechanism 12a and is discharged into the condenser 13. The compression mechanism 12a is comprised of a fixed scroll and a turning scroll. A shaft of a motor 121 is connected to the turning scroll to compress the suctioned refrigerant.

The motor 121 has a rotor accommodated in a housing 120 and a stator 122 fixed on an inner surface of the housing 120. When the stator 122 is energized, the rotor is rotated along with the shaft to drive the turning scroll. The housing 120 is made of metallic material. An exterior case 102 of the inverter 10 is fixed on the housing 120. The exterior case 102 is also made of metallic material. The housing 120 and the exterior case 102 are integrated in such a manner that heat can be transferred therebetween. The electrically-driven compressor 12 is a compressor integrated with the inverter 10.

The inverter 10 is provided with a switching element 100 and a controlling circuit 101 which are accommodated in the exterior case 102. The switching element 100 is comprised of insulated gate bipolar transistors (IGBT). The switching element 100 has six switches. Based on an ON-OFF operation of the switches, the DC power supplied from a low-voltage battery is changed into three-phase AC power, which is supplied to the motor 121. The controlling circuit 101 is provided with various electronic parts of which operation depends on the switching element 100 and is controlled by the second ECU 9.

The condenser 13 is comprised of a plurality of tubes and fins. The refrigerant discharged from the electrically-driven compressor 12 is condensed into liquid phase refrigerant. A condenser fan 14 is driven by electric power supplied from a low-voltage battery.

The receiver 15 is a gas-liquid separator. The refrigerant in the receiver 15 is separated into liquid-phase refrigerant and gas-phase refrigerant.

The pressure reducer 16 is an expansion valve which reduces the pressure of the refrigerant discharged from the condenser 13. The pressure reducer 16 is controlled by the second ECU 9.

The evaporator 17 is comprised of a plurality of tubes and fins. The refrigerant discharged from the pressure reducer 16 is evaporated into gas-phase refrigerant. The evaporator fan 18 is driven by electric power supplied from a low-voltage battery.

A pressure sensor 19a and a temperature sensor 19b are disposed downstream of the evaporator 17. The detected pressure signal and the temperature signal are transmitted to the second ECU 9.

Based on an air-conditioning requirement from a passenger, the second ECU 9 controls the inverter 10, whereby the motor 121 is started to drive the electrically-driven compressor 12. Moreover, a second ECU 9 controls the evaporator fan 18, the condenser fan 14 and the pressure reducer 16 based on the detected pressure signal and the temperature signal.

The operation of the refrigerant cycle 11 is well known operation.

A hybrid car has a first and a second motor generator and an internal combustion engine.

Until the charged voltage in the storage battery 7 becomes lower than a specified value, the vehicle is driven by the second motor generator which receives electric power from the storage battery 7. While the vehicle runs at low speed, the engine 2 is not driven. The vehicle is driven by only the second motor generator. When the vehicle runs at normal speed, the engine 2 drives the vehicle and the first motor generator to generate electric power. The second motor generator receives the generated electric power and assists a driving force of the engine 2. When the vehicle is accelerated, the electric power is supplied to the second motor generator from the storage battery 7. The driving force of the second motor generator is further supplied to the vehicle.

When the vehicle is decelerated, the second motor generator operates as a power generator which generates a regenerative electric power. The regenerative electric power is charged in the storage battery 7. When the vehicle is stopped, the engine 2 and each motor generator is stopped except for cases in which an air conditioner is operated, the engine is warming up or the storage battery is being charged. When the storage battery 7 needs to be charged, the output of the engine 2 is increased and a surplus electric power generated by the first motor generator is charged in the storage battery 7.

Figure 2:
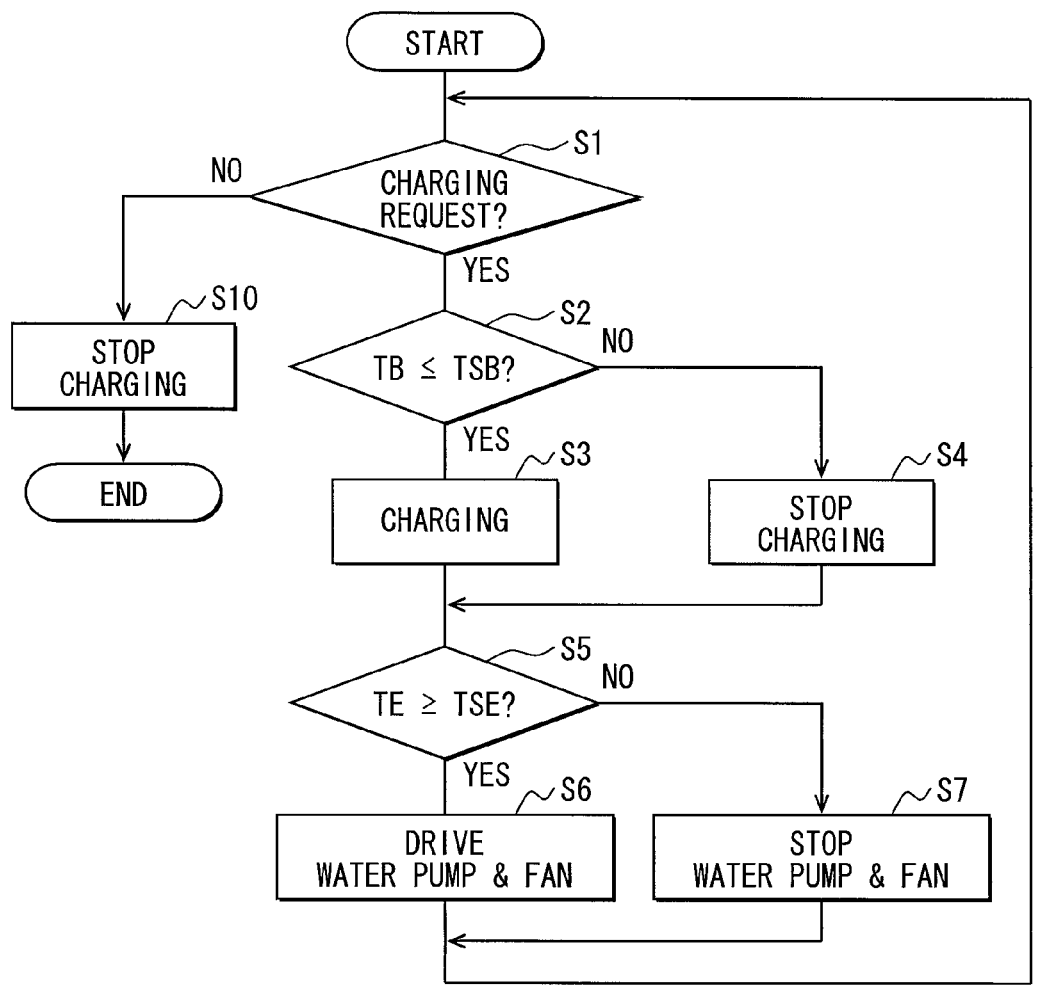
FIG. 2 is a flowchart showing a cooling control of the battery charger according to the first embodiment.
Figure 3:
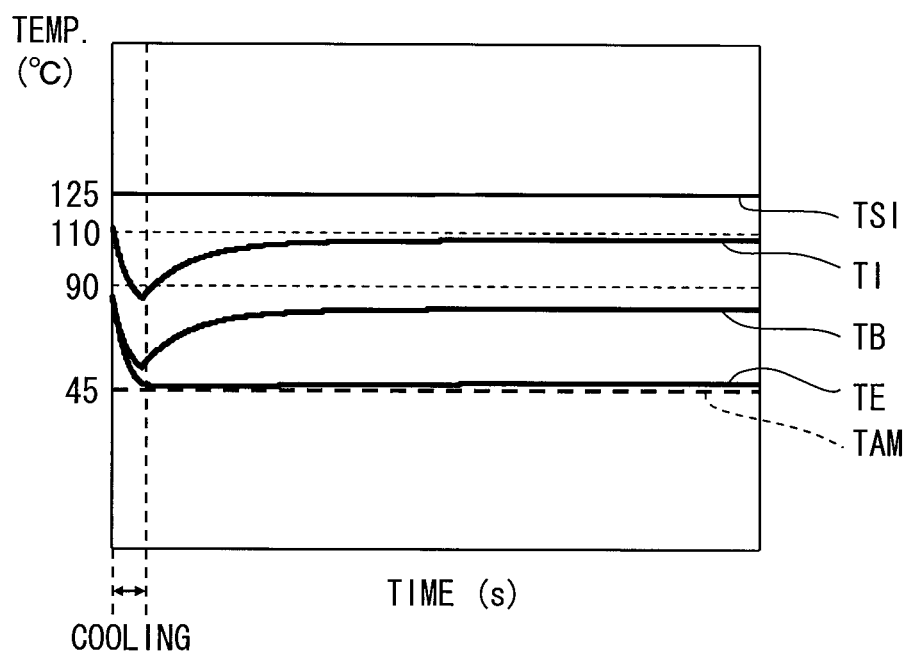
FIG. 3 is a chart showing a relationship between the cooling control of the battery charger and temperatures of each portion in a case that the charging operation is started immediately after the vehicle is started.
Figure 4:
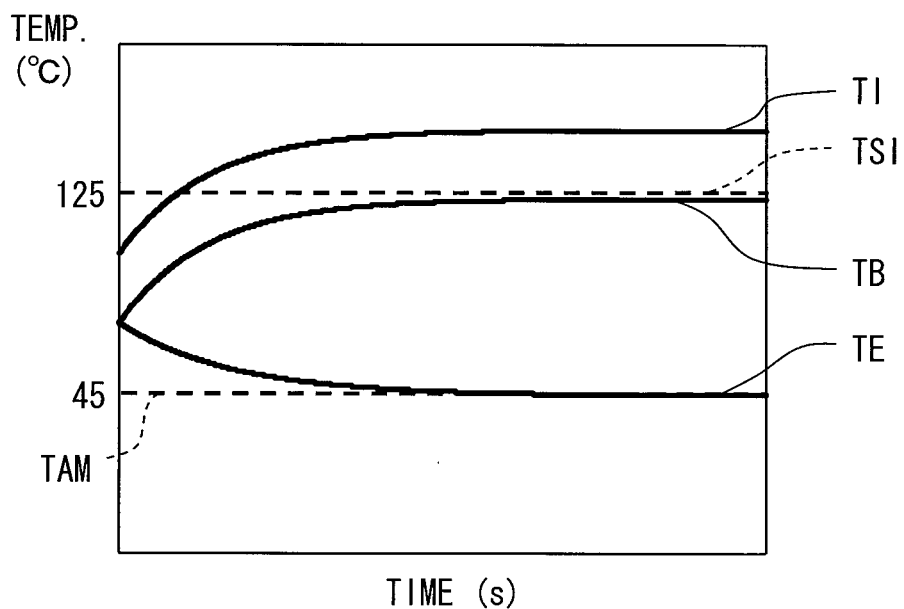
FIG. 4 is a chart showing a temperature variation in a system where the battery charger is not cooled.

Referring to FIGS. 2 to 4, a cooling control of the battery charger 5 will be described hereinafter. FIG. 2 is a flowchart showing the cooling control of the battery charger 5. In step 1, the computer determines whether a charging request is generated by a user of the vehicle. When the answer is YES in step 1, the procedure proceeds to step 2 in which the computer determines whether temperature of the battery charger 5 is lower than a specified value TSB. The temperature of the battery charger 5 is referred to as a temperature TB, hereinafter.

The temperature TB corresponds to the temperature of the case 52 of the battery charger 5 detected by the first temperature sensor 30, and the specified value TSB is 90° C., for example. When the temperature TB is 90° C., it is assumed that the temperature of the IGBT is higher than 90° C. For example, the temperature of the IGBT is 110° C. to 120° C. The upper limit temperature of IGBT is lower than or equal to 125° C. When the temperature TB is less than or equal to 90° C., the computer determines that a heat generating condition of the IGBT has no problem.

When the answer is NO in step 2, the procedure proceeds to step 3 in which a charging operation is executed. At this time, the ECU 8 converts the AC power from the commercial power source 60 into the DC power to be charged in the storage battery 7. When the battery charger 5 operates as above, the IGBT generates heat. Meanwhile, when the answer is NO in step 2, it is assumed that the IGBT should be cooled before the charging operation is executed. The procedure proceeds to step 4 in which the charging operation is terminated.

In step 5, the computer determines whether temperature of the exterior case of the engine 2 is greater than or equal to a specified temperature TSE. The temperature of the exterior case of the engine 2 is referred to as a temperature TE, hereinafter. The temperature TE corresponds to a temperature of the engine 2. The specified temperature TSE is 60° C., for example.

When the temperature TE is less than 60° C., it is assumed that the temperature TB is less than 90° C. and the temperature of IGBT is less than 120° C. If the temperature TE is less than 60° C., the computer determines that a heat generating condition of the IGBT has no problem. If the temperature TE is not less than 60° C., it is assumed that the temperature TB is not less than 90° C. and the temperature of IGBT is 125° C. or more. If the temperature TE is not less than 60° C., the computer determines that the IGBT should be cooled.

When the answer is YES in step 5, it is necessary to cool the engine 2. The procedure proceeds to step 6 in which the water pump 3 and the radiator fan 4a are driven to cool the engine 2. The heat of IGBT transferred to the exterior case of the engine 2 through the case 52 of a battery charger 5 is transferred to the engine coolant and is radiated to outside air by the radiator 4. When the answer is NO in step 5, it is unnecessary to cool the engine 2. The procedure proceeds to step 7 in which the water pump 3 and the radiator fan 4a are turned off. Moreover, in step 6, the engine 2 and the battery charger 5 may be cooled by air generated by the radiator fan 4a.

When the answer is NO in step 1, the procedure proceeds to step 10 in which the charging operation is terminated. As described above, while the charging operation is performed or before the charging operation is performed, if the temperature TE is high, the engine 2 is cooled. Moreover, in the cooling control of the battery charger 5, until the answer becomes NO in step 1, the temperature TB and the temperature TE are monitored and the temperature of IGBT is controlled.

By performing the temperature control of the IGBT (cooling control of the battery charger 5), the temperature of IGBT, the temperature TB, and the temperature TE varies as shown in FIG. 3. FIG. 3 is a chart showing a relationship between the cooling control of the battery charger 5 and temperatures of each portion in a case that the charging operation is started immediately after the vehicle is started. The temperature of IGBT, the temperature TB, and the temperature TE rapidly fall when the cooling control is started. When the cooling temperature condition is not satisfied and the cooling control is terminated, each temperature gradually increases. Until the cooling temperature condition is satisfied, each temperature is stable.

FIG. 4 shows a temperature variation in a system where the engine 2 and the battery charger 5 are not thermally connected to each other. Comparing with the temperature variation shown in FIG. 4, a temperature difference between the temperature TB and an ambient temperature TAM is relatively small in the present embodiment. Thus, the battery charger 5 performs proper functions for a long time.

Advantages of the battery charging apparatus 20 of present embodiment will be described hereinafter. The battery charger 5 is disposed on an exterior case of the engine 2 in such a manner that generated heat is transferred therebetween. The ECU 8 drives the cooling system when the engine temperature or the temperature of battery charger 5 satisfies a predetermined cooling temperature condition (step 5 and step 6).

The heat radiation path for cooling the battery charger 5 is formed through the battery charger 5, the engine 2 and the cooling systems. The heat generated by the battery charger 5 is decreased by being transferred to the engine 2. A heat transfer path length for the battery charger 5 is prolonged, whereby the battery charger 5 is efficiently cooled. Furthermore, since the engine 2 has a heat radiating area which is larger than that of the battery charger 5 and the engine 2 has the coolant circuit 1 for its own sake, a large quantity of heat can be transferred from the battery charger 5 to the engine 2.

The cooling system is comprised of the coolant circuit 1 through which engine coolant circulates to cool the engine 2, the water pump 3 which circulates the engine coolant in the coolant circuit 1, the radiator 4, and the radiator fan 4a.

Since the cooling system for cooling the engine 2 can be utilized for cooling the battery charger 5, it is unnecessary to provide an exclusive cooling system for the battery charger 5. Moreover, since the battery charger 5 and the engine 2 can be cooled at the same time, a driving frequency of the cooling system for cooling the battery charger 5 can be reduced, whereby the energy of the vehicle can be effectively utilized.

The cooling system is comprised of the radiator fan 4a which supplies cooling air toward the engine 2. Thus, the number of additional parts of the cooling system for cooling the battery charger 5 can be reduced. Moreover, since the radiator fan 4a can be utilized for cooling the battery charger 5, it is unnecessary to provide an exclusive cooling system for the battery charger 5.

Second Embodiment

Figure 5:
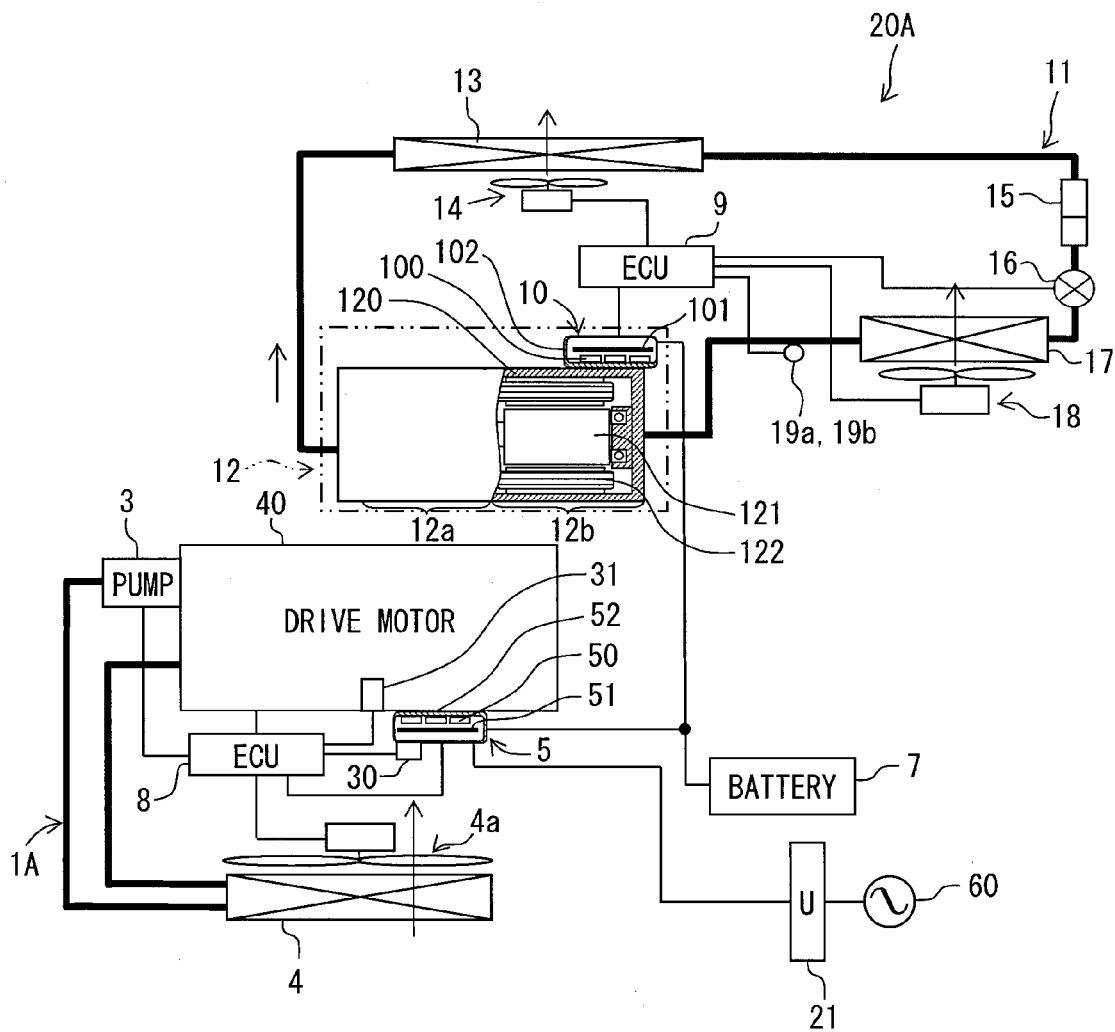
FIG. 5 is a schematic chart showing a battery charging apparatus according to a second embodiment.
Figure 6:
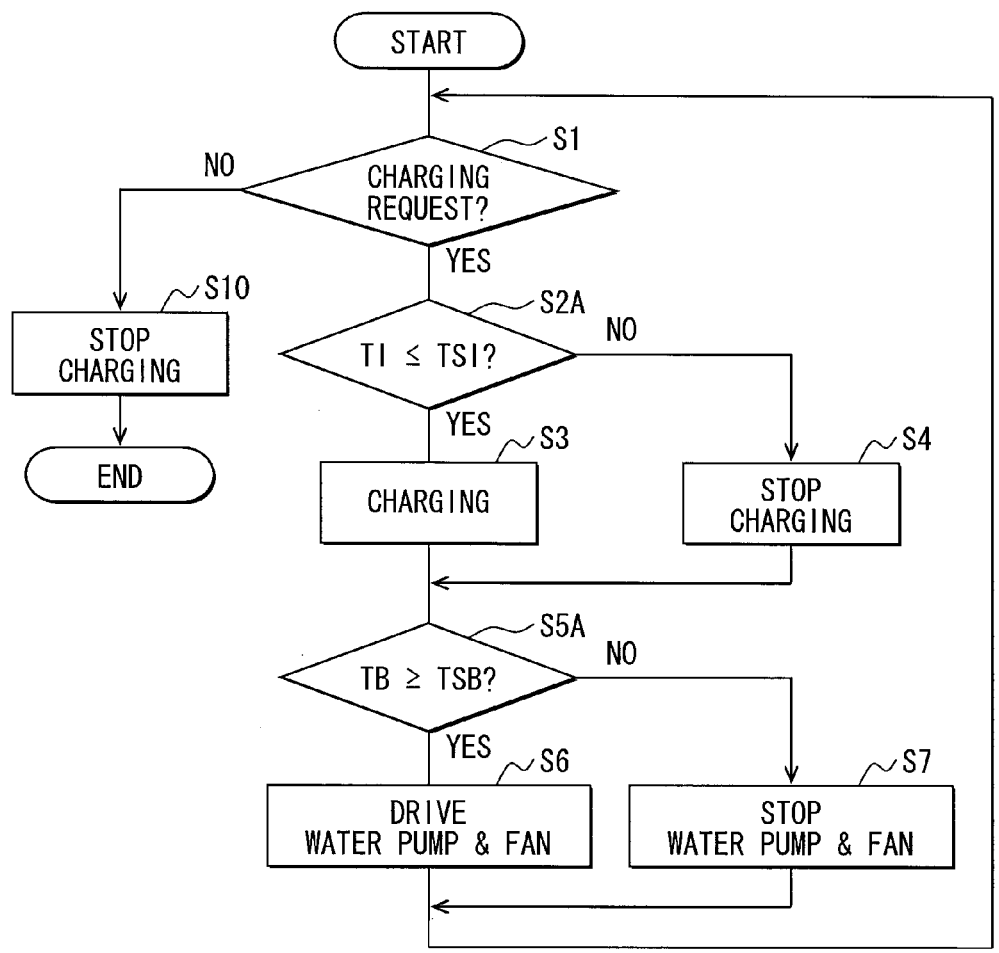
FIG. 6 is a flowchart showing a cooling control of the battery charger according to the second embodiment.

A second embodiment is a modification of the first embodiment. FIG. 5 is a schematic chart showing a battery charging apparatus 20A according to the second embodiment. FIG. 6 is a flowchart showing the cooling control of the battery charger 5 according to the second embodiment. In the battery charging apparatus 20A shown in FIG. 5, a drive motor 40 having a battery charger 5 is subject to be cooled. In the flowchart shown in FIG. 6, step 2A and step 5A are different from the flowchart shown in FIG. 2. Configurations different from the first embodiment will be described below.

As shown in FIG. 5, the battery charger 5 is disposed on an exterior case of the drive motor 40 in such a manner that generated heat is transferred therebetween. Specifically, the exterior case of the drive motor 40 and the case 52 of the battery charger 5 are in contact with each other. Alternatively, the exterior case of the drive motor 40 and the case 52 of the battery charger 5 are formed from one piece. The exterior case of the drive motor 40 and the case 52 of the battery charger 5 are made from heat-conductive material, such as aluminum, copper, iron and the like. Thus, thermal resistance between the battery charger 5 and the drive motor 40 is decreased. According to the above configuration, heat generated by the battery charger 5 is transferred to the drive motor 40 through the case 52 of a battery charger 5 and the exterior case of the drive motor 40.

In a case that the exterior case of the drive motor 40 and the case 52 of the battery charger 5 are formed separate pieces, heat conduction grease may be pasted therebetween to improve thermal conductivity.

The cooling system is comprised of a coolant circuit 1A through which engine coolant circulates to cool the drive motor 40, a water pump 3 which circulates the engine coolant in the coolant circuit 1A, a radiator 4, and a radiator fan 4a. An electronic control unit (ECU) 8 controls the water pump 3 and the radiator fan 4a. Thereby, the engine coolant passing through the radiator 4 flows through an interior of the drive motor 40.

The ECU 8 may drive the radiator fan 4a to cool the drive motor 40 and the battery charger 5 without driving the water pump 3. In this case, only the radiator fan 4a constitutes the cooling system.

As above, the ECU 8 drives the cooling system when a temperature of the drive motor 40 and a temperature of the battery charger 5 satisfy a predetermined cooling temperature condition. The heat generated by the battery charger 5 is radiated to outside through the heat radiation path which is comprised of the case 52, the exterior case of the drive motor 40, the engine coolant, the cooling air passing through the radiator 4. In a case that the cooling air generated by the radiator fan 4a flows to the drive motor 40 directly, the heat generated by the battery charger 5 is radiated to outside through the heat radiation path which is comprised of the case 52, the exterior case of the drive motor 40.

Referring to FIG. 6, a cooling control of the battery charger 5 will be described hereinafter. Only processings different from the first embodiment will be described.

When the computer determines that a charging request is generated in step 1, the procedure proceeds to step 2A in which the computer determines whether the temperature of IGBT (switching element 50) is lower than or equal to a specified temperature TSI. The specified temperature TSI is 125° C., for example. The temperature of IGBT is referred to as a temperature TI. The upper limit temperature TI is lower than or equal to 125° C. When the answer is YES in step 2A, the computer determines that a heat generating condition of the IGBT has no problem.

When the answer is YES in step 2A, the procedure proceeds to step 3 in which the charging operation is executed. Meanwhile, when the answer is NO in step 2A, it is assumed that the IGBT should be cooled before the charging operation is executed. The procedure proceeds to step 4 in which the charging operation is terminated.

In step 5A, the computer determines whether temperature of the exterior case 52 of the battery charger 5 is greater than or equal to the specified temperature TSB. The temperature of the exterior case 52 of the battery charger 5 corresponds to the temperature TB. The temperature TB is detected by the first temperature sensor 30, and the specified value TSB is 90° C., for example.

When the temperature TB is less than 90° C., it is assumed that the temperature TI is less than 125° C. and the computer determines that a heat generating condition of the IGBT has no problem. When the temperature TB is not less than 90° C., it is assumed that the temperature TI is 125° C. or more. If the temperature TB is not less than 90° C., the computer determines that the IGBT should be cooled.

When the answer is YES in step 5A, it is necessary to cool the drive motor 40. The procedure proceeds to step 6 in which the water pump 3 and the radiator fan 4a are driven to cool the drive motor 40. The heat of IGBT transferred to the exterior case of the drive motor 40 through the case 52 of a battery charger 5 is transferred to the engine coolant and is radiated to outside air by the radiator 4. When the answer is NO in step 5A, it is unnecessary to cool the drive motor 40. The procedure proceeds to step 7 in which the water pump 3 and the radiator fan 4a are turned off. Moreover, in step 6, the drive motor 40 and the battery charger 5 may be cooled by air generated by the radiator fan 4a.

In addition, in step 5A, the temperature TB can be replaced by the temperature of the exterior case of the drive motor 40. In this case, the specified temperature is 60° C., for example. When the temperature of the exterior case of the drive motor 40 is less than 60° C., it is assumed that the temperature TB is less than 90° C. and the temperature TI is less than 120° C. If the temperature of the exterior case of the drive motor 40 is less than 60° C., the computer determines that a heat generating condition of the IGBT has no problem. If the temperature of the exterior case of the drive motor 40 is not less than 60° C., it is assumed that the temperature TB is not less than 90° C. and the temperature of IGBT is 125° C. or more. If the temperature of the exterior case of the drive motor 40 is not less than 60° C., the computer determines that the IGBT should be cooled.

Advantages of the battery charging apparatus 20A of present embodiment will be described hereinafter. The battery charger 5 is disposed on an exterior case of the drive motor 40 in such a manner that generated heat is transferred therebetween. As above, the ECU 8 drives the cooling system to cool the drive motor 40 when the temperature of drive motor 40 or the temperature of the battery charger 5 satisfy a predetermined cooling temperature condition.

The heat radiation path for cooling the battery charger 5 is formed through the battery charger 5, the drive motor 40 and the cooling systems. The heat generated by the battery charger 5 is decreased by being transferred to the drive motor 40. A heat transfer path length for the battery charger 5 is prolonged, whereby the battery charger 5 is efficiently cooled. Furthermore, since the drive motor 40 has a heat radiating area which is larger than that of the battery charger 5 and the drive motor 40 has the coolant circuit 1A for its own sake, a large quantity of heat can be transferred from the battery charger 5 to the drive motor 40.

The cooling system is comprised of the coolant circuit 1A through which engine coolant circulates to cool the drive motor 40, a water pump 3 which circulates the engine coolant in the coolant circuit 1A, a radiator 4, and a radiator fan 4a.

Since the cooling system for cooling the drive motor 40 can be utilized for cooling the battery charger 5, it is unnecessary to provide an exclusive cooling system for the battery charger 5. Moreover, since the battery charger 5 and the drive motor 40 can be cooled at the same time, a driving frequency of the cooling system for cooling the battery charger 5 can be reduced, whereby the energy of the vehicle can be effectively utilized.

The cooling system is comprised of the radiator fan 4a which supplies cooling air toward the drive motor 40. Thus, the number of additional parts of the cooling system for cooling the battery charger 5 can be reduced. Since the cooling system for cooling the drive motor 40 can be utilized for cooling the battery charger 5, it is unnecessary to provide an exclusive cooling system for the battery charger 5.

Third Embodiment

Figure 7:
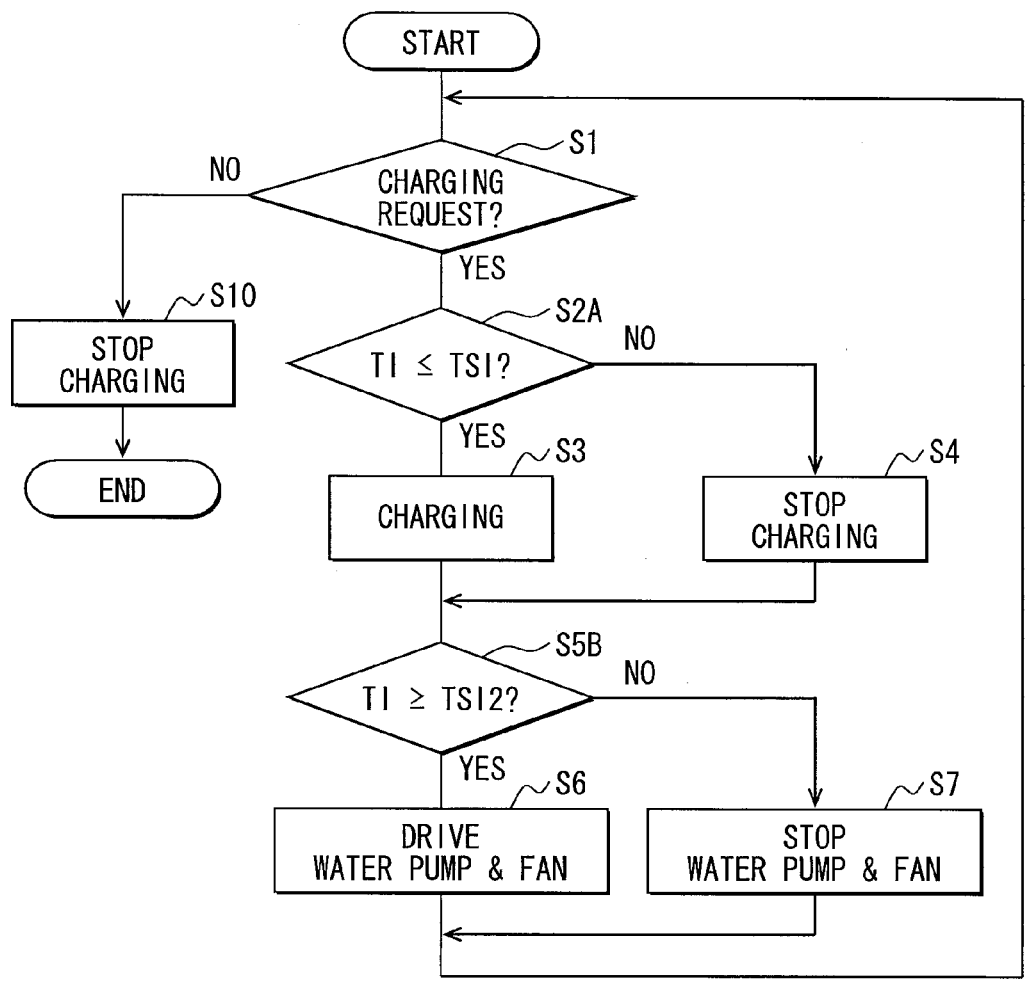
FIG. 7 is a flowchart showing a cooling control of the battery charger according to a third embodiment.

A third embodiment is a modification of the first embodiment. FIG. 7 is a flowchart showing the cooling control of the battery charger 5 according to the third embodiment. In the flowchart shown in FIG. 7, step 2A and step 5B are different from the flowchart shown in FIG. 2. Referring to FIG. 7, a cooling control of the battery charger 5 will be described hereinafter. Only processings different from the first embodiment will be described.

When the computer determines that a charging request is generated in step 1, the procedure proceeds to step 2A in which the temperature of IGBT (switching element 50) is lower than or equal to a specified temperature TSI. The specified temperature TSI is 125° C., for example. The temperature of IGBT is referred to as a temperature TI. The upper limit temperature TI is lower than or equal to 125° C. When the answer is YES in step 2A, the computer determines that a heat generating condition of the IGBT has no problem.

When the answer is NO in step 2A, the procedure proceeds to step 3 in which the charging operation is executed. Meanwhile, when the answer is NO in step 2A, it is assumed that the IGBT should be cooled before the charging operation is executed. The procedure proceeds to step 4 in which the charging operation is terminated.

In step 5B, the computer determines whether the temperature TI is greater than or equal to a specified temperature TSI2. The temperature TSI2 is lower than the temperature TSI. For example, the temperature TSI2 is 110° C.

If the temperature TI is less than 110° C., the computer determines that a heat generating condition of the IGBT has no problem. If the temperature TI is not less than 90° C., the computer determines that the IGBT should be cooled.

When the answer is YES in step 5B, it is necessary to cool the drive motor 40 and the engine 2. The procedure proceeds to step 6 in which the water pump 3 and the radiator fan 4a are driven to cool the drive motor 40 and the engine 2. The heat of IGBT transferred to the exterior cases of the drive motor 40 and the engine 2 through the case 52 of a battery charger 5 is transferred to the engine coolant and is radiated to outside air by the radiator 4. When the answer is NO in step 5b, it is unnecessary to cool the drive motor 40 and the engine 2. The procedure proceeds to step 7 in which the water pump 3 and the radiator fan 4a are turned off. Moreover, in step 6, the drive motor 40 and the engine 2 or the battery charger 5 may be cooled by air generated by the radiator fan 4a.

Fourth Embodiment

Figure 8:
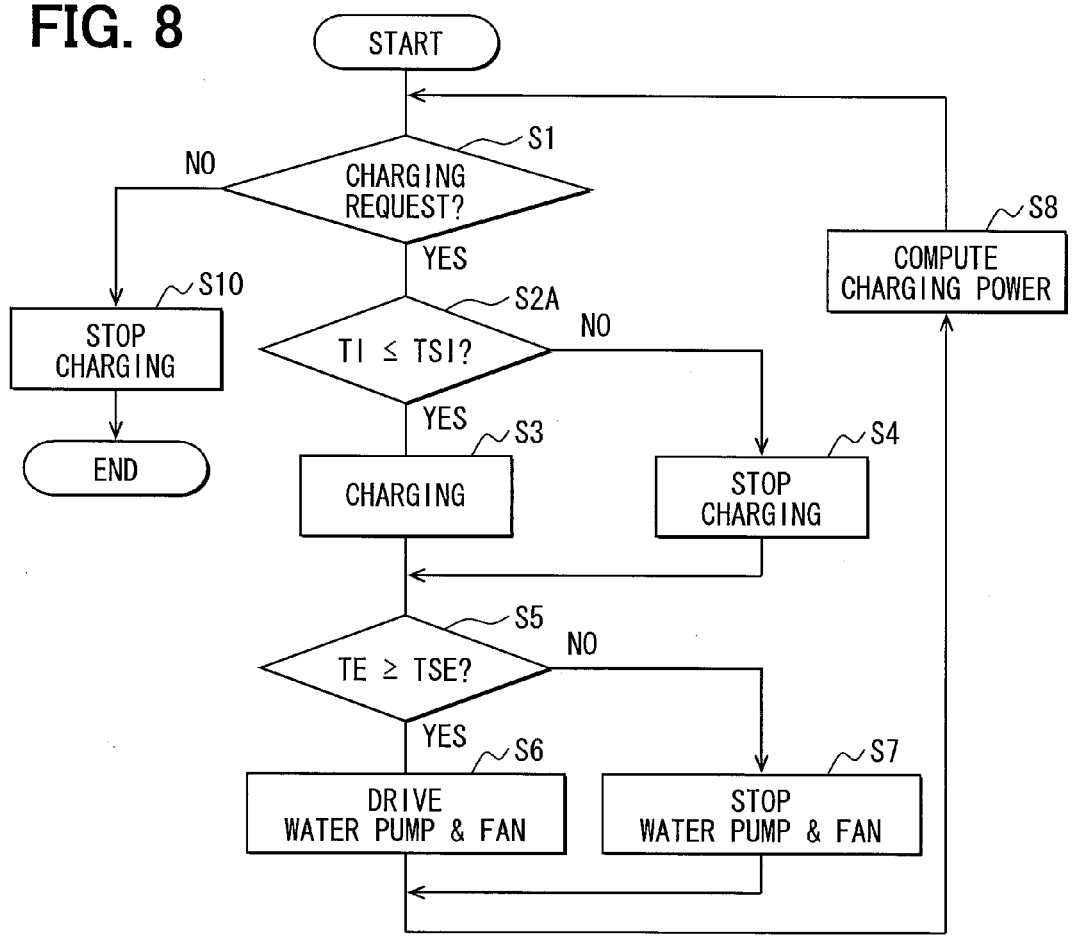
FIG. 8 is a flowchart showing a cooling control of the battery charger according to a fourth embodiment.
Figure 9:
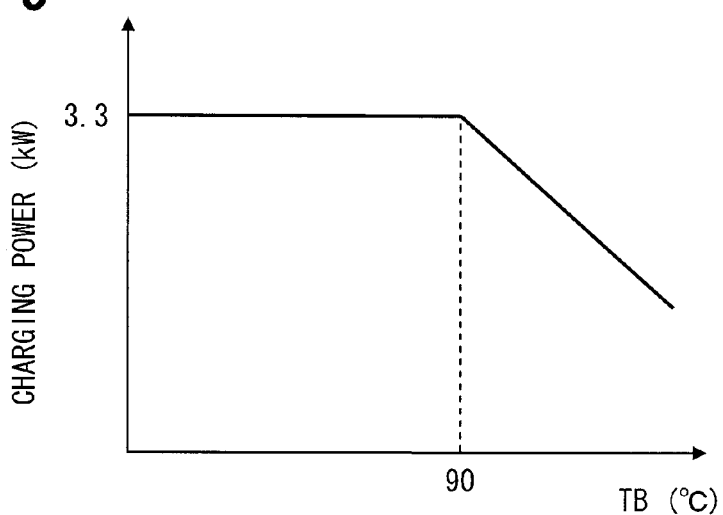
FIG. 9 is a charging-power computation map which is used in step 8 of FIG. 8.

A fourth embodiment is a modification of the first embodiment. FIG. 8 is a flowchart showing the cooling control of the battery charger 5 according to the fourth embodiment. FIG. 9 shows a charging-power computation map which is used in step 8. In the flowchart shown in FIG. 8, step 2A and step 8 are different from the flowchart shown in FIG. 2. Referring to FIGS. 8 and 9, a cooling control of the battery charger 5 will be described hereinafter. Only processings different from the first embodiment will be described.

The ECU 8 includes a read only memory (ROM) and a random access memory (RAM) in which various control programs and maps are stored. The charging-power computation map is stored in the ROM and/or the RAM.

When the computer determines that a charging request is generated in step 1, the procedure proceeds to step 2A in which the computer determines whether the temperature of IGBT (switching element 50) is lower than or equal to a specified temperature TSI. The specified temperature TSI is 125° C., for example. The temperature of IGBT is referred to as a temperature TI. The upper limit temperature TI is lower than or equal to 125° C. When the answer is YES in step 2A, the computer determines that a heat generating condition of the IGBT has no problem.

When the answer is NO in step 2A, the procedure proceeds to step 3 in which the charging operation is executed. Meanwhile, when the answer is NO in step 2A, it is assumed that the IGBT should be cooled before the charging operation is executed. The procedure proceeds to step 4 in which the charging operation is terminated.

When the answer is YES in step 5 and when the water pump 3 and a radiator fan 4a are driven in step 6, the procedure proceeds to step 8 in which a charging power at charging operation is computed according to the charging-power computation map shown in FIG. 9. Also when the answer is NO in step 5 and when the water pump 3 and a radiator fan 4a are turned off in step 7, the procedure proceeds to step 8 in which the charging power at charging operation is computed according to the charging-power computation map shown in FIG. 9.

In step 8, the charging power is computed based on the temperature TB detected by the first temperature sensor 30 according to the charging-power computation map. For example, when the temperature TB is lower than or equal to 90° C., the charging power is set to 3.3 kW. When the temperature TB exceeds 90° C., the charging power is linearly decreased.

According to the fourth embodiment, the charging power is defined according to the temperature TB, the temperature TI, the temperature TE. When the computer determines these temperature TB, TI, TE are high, the charging power is decreased. Thus, the temperature TB is appropriately controlled, so that the temperature TB does not excessively increase.

Fifth Embodiment

Figure 10:
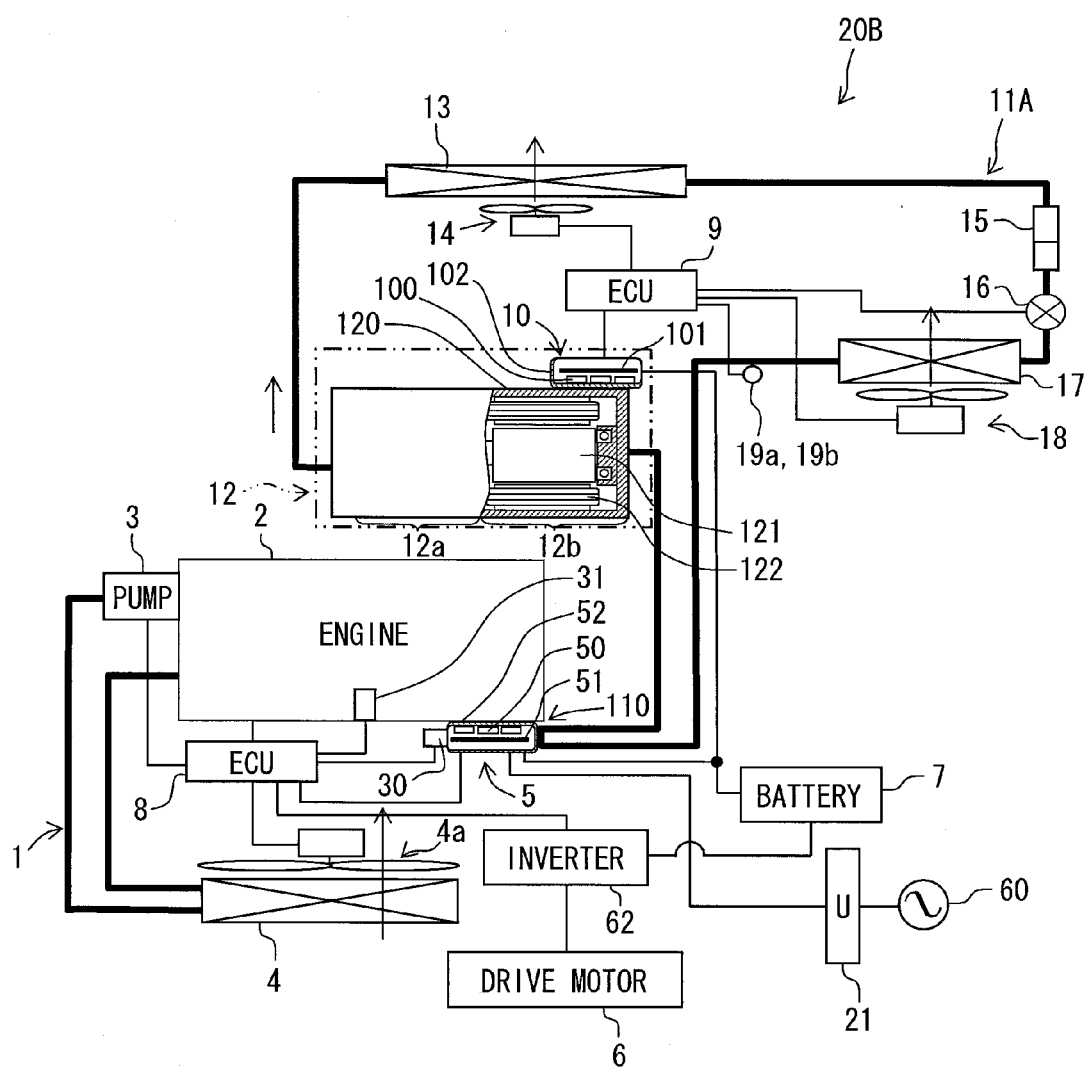
FIG. 10 is a schematic chart showing a battery charging apparatus according to a fifth embodiment.
Figure 11:
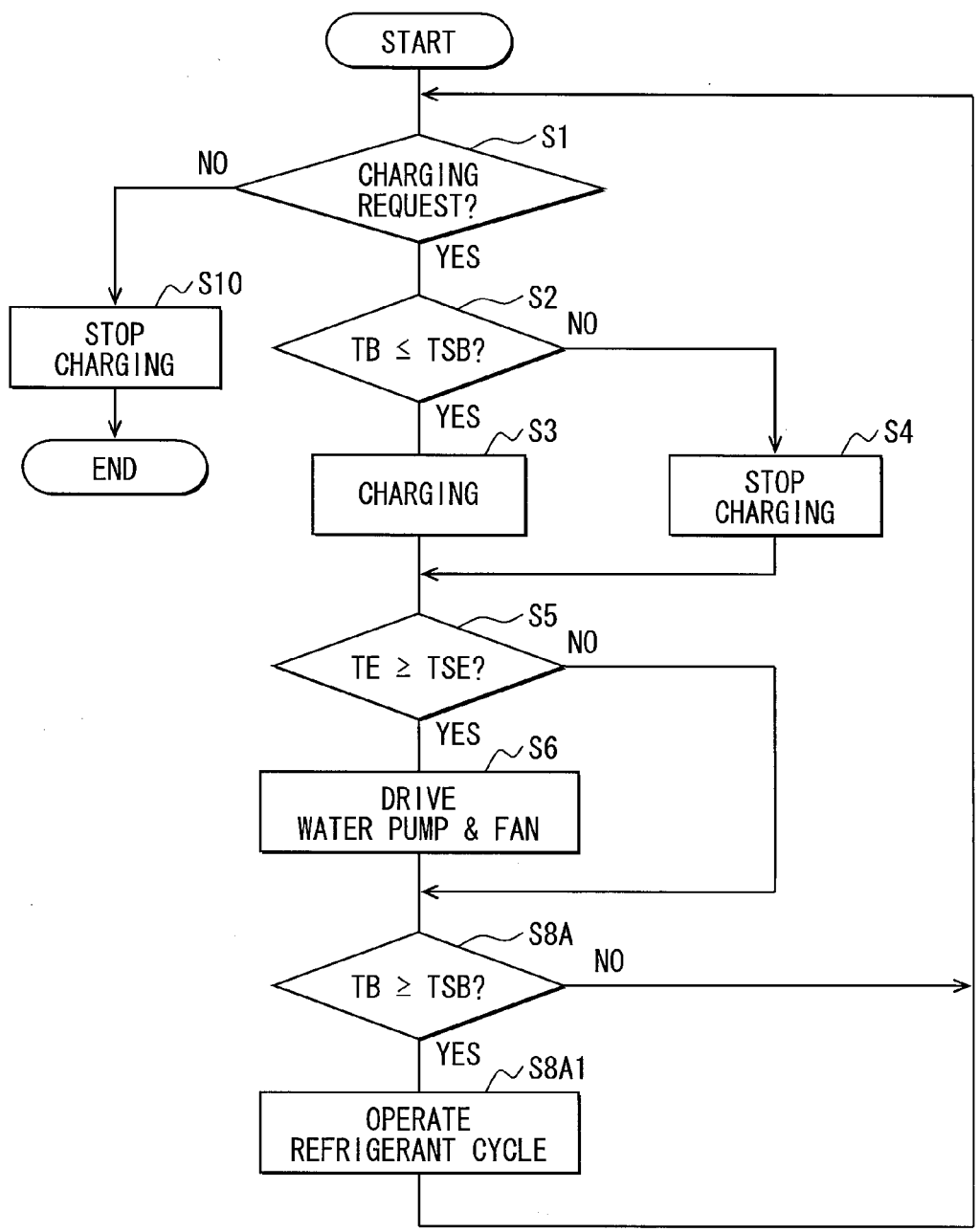
FIG. 11 is a flowchart showing a cooling control of the battery charger according to the first embodiment.

A fifth embodiment is a modification of the first embodiment. FIG. 10 is a schematic chart showing a battery charging apparatus 20B according to the fifth embodiment. FIG. 11 is a flowchart showing the cooling control of the battery charger 5 according to the fifth embodiment. In the battery charging apparatus 20B, the refrigerant cycle 11A and the battery charger 5 have different configuration from the above embodiments. In the flowchart shown in FIG. 11, step 8A and step 8A1 are different from the flowchart shown in FIG. 2. Configurations different from the first embodiment will be described below.

As shown in FIG. 10, the battery charger 5 is arranged in such a manner that generated heat is transferred between the battery charger 5 and a low-pressure portion 110 of the refrigerant cycle. The low-pressure portion 110 corresponds to a refrigerant passage between the pressure reducer 16 and the electrically-driven compressor 12.

Specifically, the case 52 of a battery charger 5 is in contact with a pipe of the low-pressure portion 110. Alternatively, the pipe of the low-pressure portion 110 and the case 52 of the battery charger 5 are formed from one piece. The pipe and the case 52 are made from heat-conductive material, such as aluminum, copper, iron and the like. Thus, thermal resistance between the battery charger 5 and the low-pressure portion 110 is decreased.

According to the above configuration, the heat generated by battery charger 5 is absorbed by the low-pressure refrigerant (0° C.) flowing through the low-pressure portion 110. Moreover, when the temperature TB satisfies the cooling temperature condition, the ECU 8 operates the cooling system and the refrigerant cycle 11A for cooling the battery charger 5.

The heat generated by the battery charger 5 is radiated to outside through the heat radiation path which is comprised of the case 52, the exterior case of the engine 2, the engine coolant, the cooling air passing through the radiator 4. Furthermore, when the refrigerant cycle 11A is operated, the heat generated by the battery charger 5 is radiated to outside through the heat radiation path which is comprised of the case 52 of a battery charger 5 and the low-pressure portion 110.

In a case that the low-pressure portion 110 and the case 52 of the battery charger 5 are formed separate pieces, heat conduction grease may be pasted therebetween to improve thermal conductivity.

Referring to FIG. 11, a cooling control of the battery charger 5 will be described hereinafter. Only processings different from the first embodiment will be described.

When the answer is YES in step 5, it is necessary to cool the engine 2. The procedure proceeds to step 6 in which the water pump 3 and the radiator fan 4a are driven to cool the engine 2. Then, the procedure proceeds to step 8A. When the answer is NO in step 5, the procedure proceeds to step 8A.

In step 8A, the computer determines whether the temperature (TB) of the exterior case 52 of the battery charger 5 is greater than or equal to the specified temperature TSB. The temperature TB is detected by the first temperature sensor 30, and the specified value TSB is 90° C., for example.

When temperature TB is less than 90° C., it is assumed that the temperature TI is less than 125° C. and the computer determines that a heat generating condition of the IGBT has no problem. When the temperature TB is not less than 90° C., it is assumed that the temperature TI is 125° C. or more. If the temperature TB is not less than 90° C., the computer determines that the IGBT should be cooled.

When the answer is YES in step 8A, it is necessary to further cool the battery charger 5. The procedure proceeds to step 8A1 in which the refrigerant cycle 11A is operated to cool the battery charger 5. The heat of IGBT transferred to the case 52 of a battery charger 5 is transferred to the refrigerant. When the answer is NO in step 8A, the procedure goes back to step 1.

Advantages of the battery charging apparatus 20B of present embodiment will be described hereinafter. In the battery charging apparatus 20B, the case 52 of the battery charger 5 is arranged in such a manner that generated heat is transferred between the battery charger 5 and the low-pressure portion 110 of the refrigerant cycle. When the cooling temperature condition is satisfied, the refrigerant cycle 11A is operated (step 8A1).

Since the battery charger 5 is cooled by both the cooling system and the refrigerant cycle 11A, the temperature increase of the battery charger 5 is rapidly restricted.

Since the battery charger 5 can be cooled in step 6 and step 8A1, the battery charger 5 is surely cooled.

The low-pressure portion 110 may be integrated with exterior case of the engine 2 or the drive motor 40.

When the cooling temperature condition is satisfied in step 5, the drive motor 40 or the engine 2 is cooled by both the cooling system and the refrigerant cycle 11A (step 6, step 8A1). Thus, the temperature increase of the battery charger 5 is rapidly restricted. Thus, the temperature TB is appropriately controlled, and the charging operation and the driving of the drive motor 40 can be appropriately conducted.

Sixth Embodiment

Figure 12:
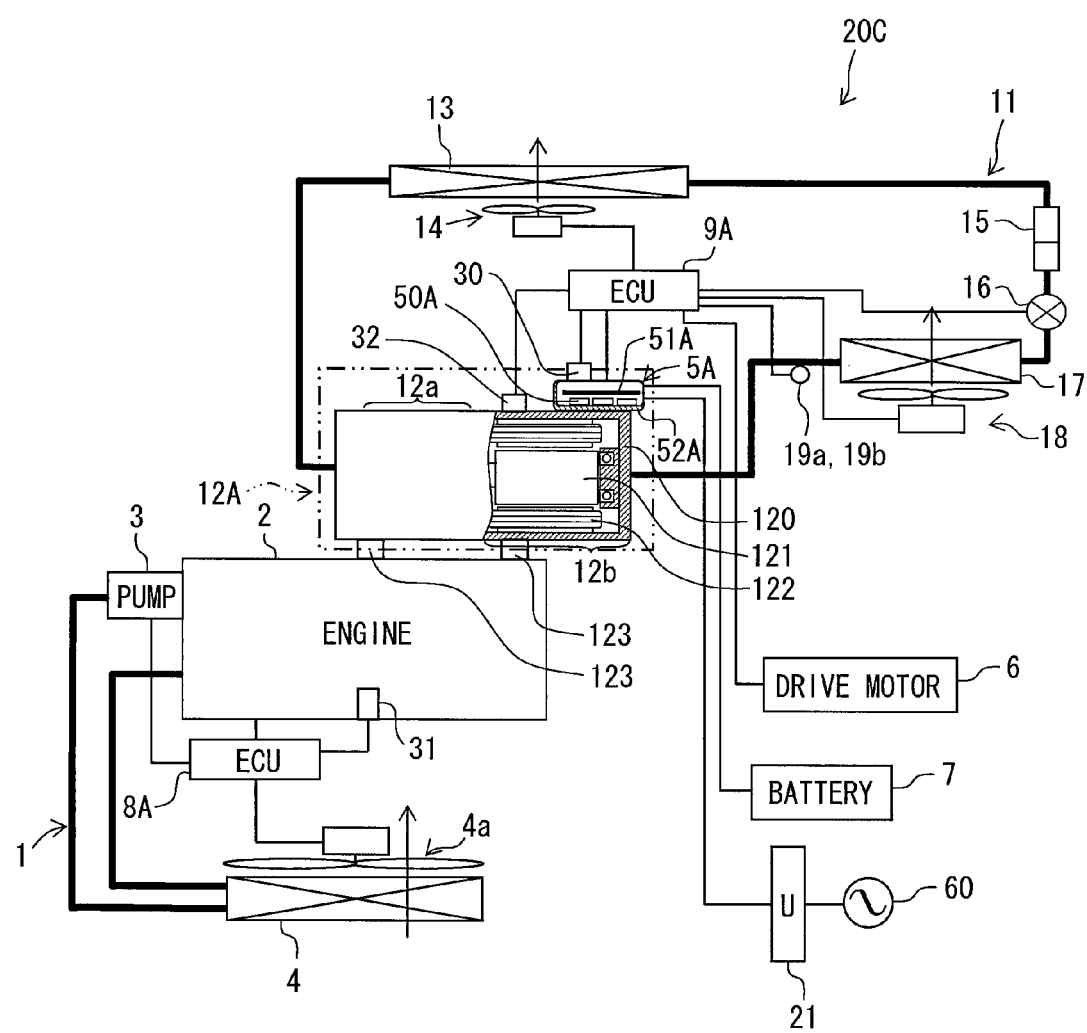
FIG. 12 is a schematic chart showing a battery charging apparatus according to a sixth embodiment.
Figure 13:
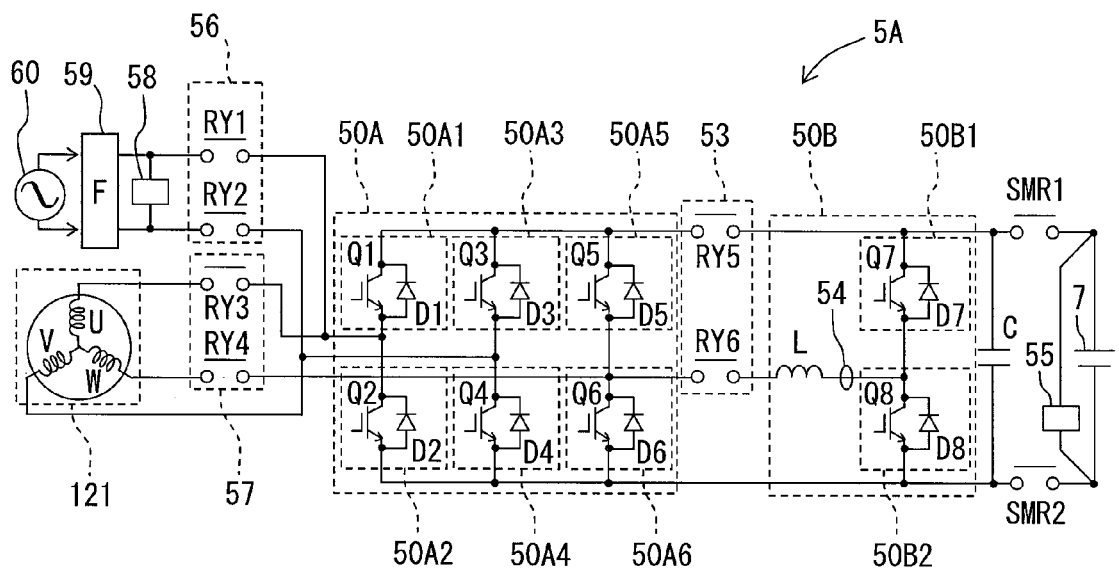
FIG. 13 is a circuit diagram showing a configuration of a battery charger in a battery charging apparatus according to the sixth embodiment.
Figure 15:
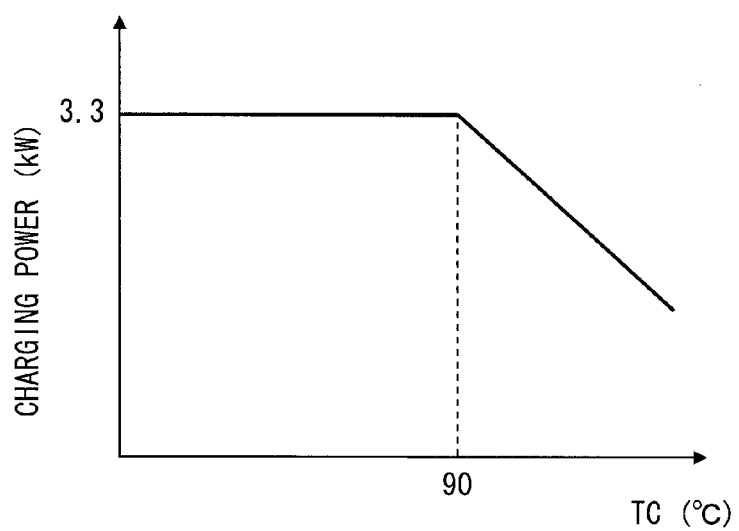
FIG. 15 is a charging-power computation map which is used in step 8B2 of FIG. 14.
Figure 14:
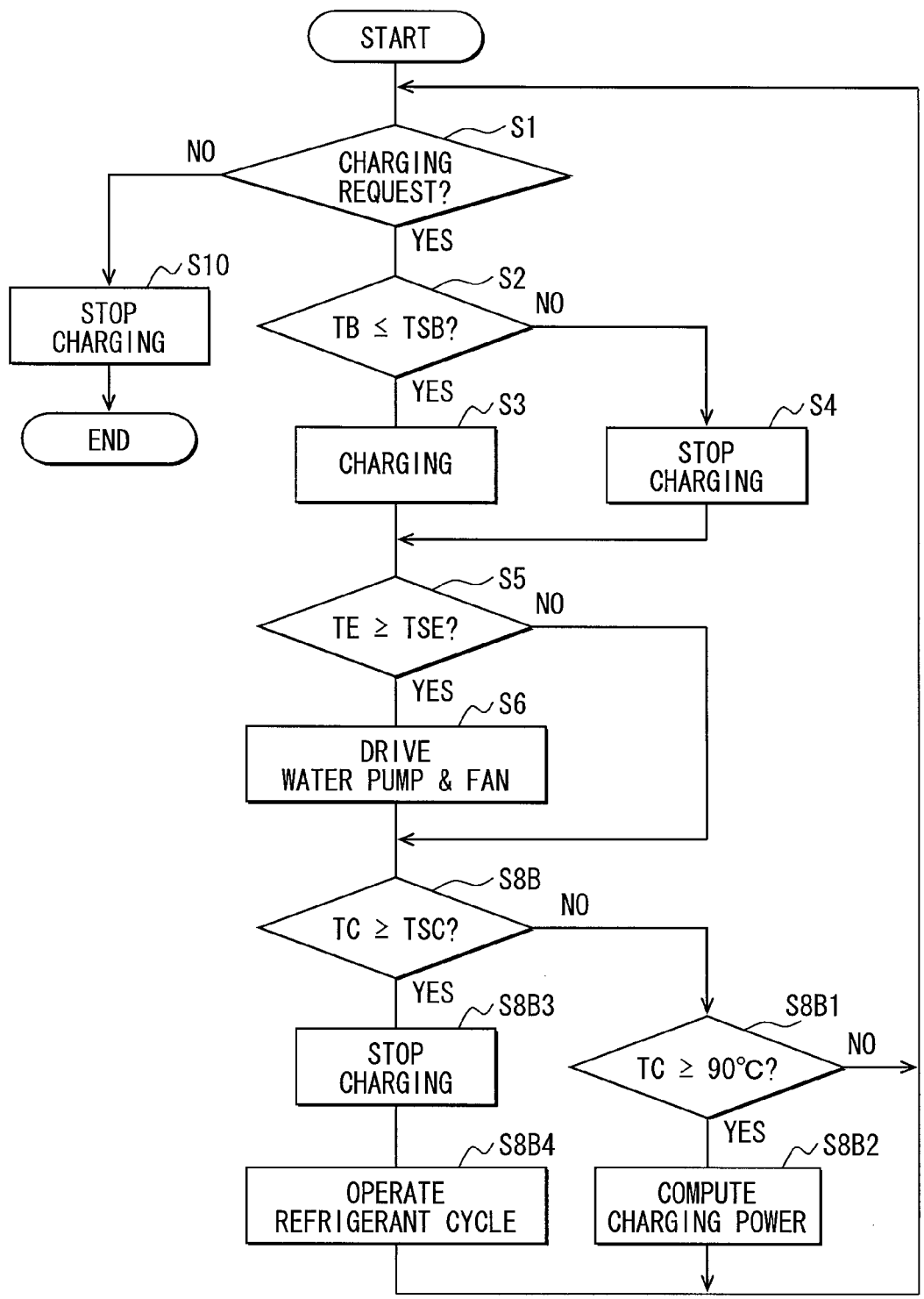
FIG. 14 is a flowchart showing a cooling control of the battery charger according to the sixth embodiment.

A sixth embodiment is a modification of the first embodiment. FIG. 12 is a schematic chart showing a battery charging apparatus 20C according to the fifth embodiment. FIG. 13 is a circuit diagram showing a configuration of a battery charger 5A in a battery charging apparatus 20C. FIG. 14 is a flowchart showing the cooling control of the battery charger 5A according to the sixth embodiment. FIG. 15 shows a charging-power computation map which is used in step 8B2 of FIG. 14. Configurations different from the first embodiment will be described below.

As shown in FIGS. 12 and 13, the battery charging apparatus 20C has a battery charger 5A. The battery charger 5A has an inverter 50A therein, and is integrated with an electrically-driven compressor 12A. The battery charger 5A is disposed on a housing 120 of the compressor 12A in a vicinity of an inlet of the compressor 12A. That is, the heat generated by the battery charger 5A is absorbed by the refrigerant which will be compressed by the compressor 12A.

The electrically-driven compressor 12A is disposed on an exterior case of the engine 2 in such a manner that the generated heat is transferred therebetween. The compressor 12A has legs 123 which are connected to the exterior case of the engine 2.

Specifically, the housing 120 of the compressor 12A and a case 52A of the battery charger 5A are in contact with each other. Alternatively, the housing 120 and the case 52A are formed from one piece. The housing 120 and the case 52A are made of heat-conductive material, such as aluminum, copper, iron and the like. Thus, thermal resistance between the battery charger 5A and the compressor 12A is decreased. According to the above configuration, heat generated by the battery charger 5A is transferred to the engine 2 through the case 52A of a battery charger 5A and the housing 120. In a case that the housing 120 and the case 52A are formed separate pieces, heat conduction grease may be pasted therebetween to improve thermal conductivity.

A third temperature sensor 32 detects the temperature of the housing 120. The detected temperature signal is transmitted to an ECU 9A. Since a heat-conducting characteristic between the compressor 12A and the battery charger 5A is kept favorable, the computer can determines whether it is necessary to cool the battery charger 5A by monitoring the detected temperature by the temperature sensors 30, 32. Alternatively, the computer can determines whether it is necessary to cool the battery charger 5A by monitoring the detected temperature by the second temperature sensor 31.

The ECU 9A controls the inverter 10, the battery charger 5A, the condenser fan 14, the evaporator fan 18, and the pressure reducer 16. The ECU 9A includes a read only memory (ROM) and a random access memory (RAM) in which various control programs and maps are stored for controlling the compressor 12A and the battery charger 5A. An ECU 8A controls the engine 2 and the cooling system.

The battery charger 5A converts AC power supplied from the commercial power source 60 into DC power to be charged in the storage battery 7. When the ignition switch or the start switch is turned on, the drive motor 6 is controlled by the ECU 9A. The drive motor 6 is energized to drive the vehicle. Furthermore, the battery charger 5A has a function for controlling the electrically-driven compressor 12 of the refrigerant cycle 11. That is, the battery charger 5A has a function for charging the storage battery 7 and a function as an inverter driving the compressor 12A.

As shown in FIG. 13, the battery charger 5A includes the inverter 50A, the various relays 53, 56 and 57 and the boost converter 50B. The boost converter 50B includes a reactor L, and Insulated Gate Bipolar Transistors (IGBTs) 50B1 and 50B2. One end of the reactor L is connected to the relay 53 and the other end is connected to junction points of IGBTs 50B1 and 50B2. The relay 53 connects the inverter 50A to the boost converter 50B. A current sensor 54 detects electric current flowing from the reactor L into the junction points of IGBTs 50B1 and 50B2. The boost converter 50B and the storage battery 7 are connected by system main relays SMR1 and SMR2. The direct current voltage supplied from the storage battery 7 is transmitted to the boost converter 50B. Moreover, the storage battery 7 is charged with the direct current voltage transmitted from the boost converter 50B.

A voltage sensor 58 detects the electric voltage of the commercial power source 60. The electric power from the commercial power source 60 is supplied through a noise filter 59. The relay 56 connects the commercial power source 60 to the inverter 50A. The relay 57 connects the motor 121 of the electrically-driven compressor 12A to the inverter 50A. A voltage sensor 55 detects the electric voltage of the storage battery 7.

The inverter 50A is comprised of IGBTs 50A1, 50A2, 50A3, 50A4, 50A5, and 50A6. Based on an ON-OFF operation of the above switches of the inverter 50A, the DC power supplied from the storage battery 7 is changed into three-phase AC power, which is supplied to the motor 121. Since the inverter 50A generates heat due to power loss, it is necessary to cool the inverter 50A. The generated heat is transferred to the case 52A and the exterior case of the engine 2 through the compressor 12A. A controlling circuit 51A is provided with various electronic parts of which operation depends on the IGBTs 50A1 to 50A6, 50B1 and 50B2. The controlling circuit 51A is controlled by the ECU 9A.

As mentioned above, since the battery charger 5A has a function for charging the storage battery 7 and a function as an inverter driving the compressor 12A, the operation of the battery charger 5A and the operation of the refrigerant cycle 11 are independently conducted.

Besides, the electrically-driven compressor 12A may be integrally configured with the exterior case of the drive motor 40. That is, in the battery charging apparatus of the present embodiment, the engine 2 may be replaced by the drive motor 40 shown in FIG. 5.

Referring to FIGS. 14 and 15, a cooling control of the battery charger 5A will be described hereinafter. In a flowchart shown in FIG. 11, steps 8B, 8B1, 8B2, 8B3 and 8B4 are different from the flowchart shown in FIG. 2. Only processings different from the first embodiment will be described.

When the answer is YES in step 5, it is necessary to cool the engine 2. The procedure proceeds to step 6 in which the water pump 3 and the radiator fan 4a are driven to cool the engine 2. Then, the procedure proceeds to step 8B. Also, when the answer is NO in step 5, the procedure proceeds to step 8B.

In step 8B, the computer determines whether temperature of the housing 120 of the compressor 12A is greater than or equal to the specified temperature TSC. The temperature of the housing 120 of the compressor 12A is referred to as the temperature TC, hereinafter. The temperature TC is detected by the third temperature sensor 32, and the specified value TSC is 95° C., for example.

When the temperature TC is less than 95° C., it is assumed that the temperature TI is less than 125° C. and the computer determines that a heat generating condition of the IGBT has no problem. When the temperature TC is not less than 95° C., it is assumed that the temperature TI is 125° C. or more. If the temperature TC is not less than 95° C., the computer determines that the IGBT should be cooled.

When the answer is YES in step 8B, it is necessary to further cool the battery charger 5A. The procedure proceeds to step 8B3 in which the charging operation is stopped. Then the procedure proceeds to step 8B4 in which the refrigerant cycle 11 is operated. Thereby, the low-pressure refrigerant flowing through the compressor 12A cools the battery charger 5A. The heat of IGBT transferred to the case 52A of the battery charger 5A is transferred to the refrigerant through the housing 120.

When the answer is NO in step 8B, the procedure proceeds to step 8B1 in which the computer determines whether the temperature TC is not less than 90° C. If the temperature TC is less than 90° C., the computer determines that a heat generating condition of the IGBT has no problem. The procedure goes back to step 1 without cooling the battery charger 5A.

If the temperature TC is not less than 90° C., the computer determines that the IGBT should be cooled. The procedure proceeds to step 8B2. In step 8B2, the charging power is computed based on the temperature TC detected by the temperature sensor 32 according to the charging-power computation map shown in FIG. 15. For example, when the temperature TC is lower than or equal to 90° C., the charging power is set to 3.3 kW. When the temperature TC exceeds 90° C., the charging power is linearly decreased.

Advantages of the battery charging apparatus 20C of present embodiment will be described hereinafter. According to the sixth embodiment, the charging power is defined according to the temperature TB and the temperature TC. When the computer determines these temperatures TB and TC are high, the charging power is decreased. Thus, the temperature TB is appropriately controlled, so that the temperature TB does not excessively increase. That is, the battery charger 5A charges the storage battery 7 with the electric power which depends on the temperature TB.

Therefore, the storage battery 7 can be properly charged and the battery charger 5A is efficiently cooled.

Moreover, when the temperature TC is greater than a specified temperature (for example, 95° C.) and the battery charger 5A needs to be cooled, the charging operation is compulsorily terminated and the refrigerant cycle 11 is operated to cool the battery charger 5A.

Moreover, when the temperature TC is between 90° C. and 95° C., the charging power is reduced according to the temperature TC and the charging operation is continued. Thus, while the charging request from a user of the vehicle is satisfied without interrupting the charging, the battery charger 5A can be controlled to a proper temperature.

Seventh Embodiment

Figure 16:
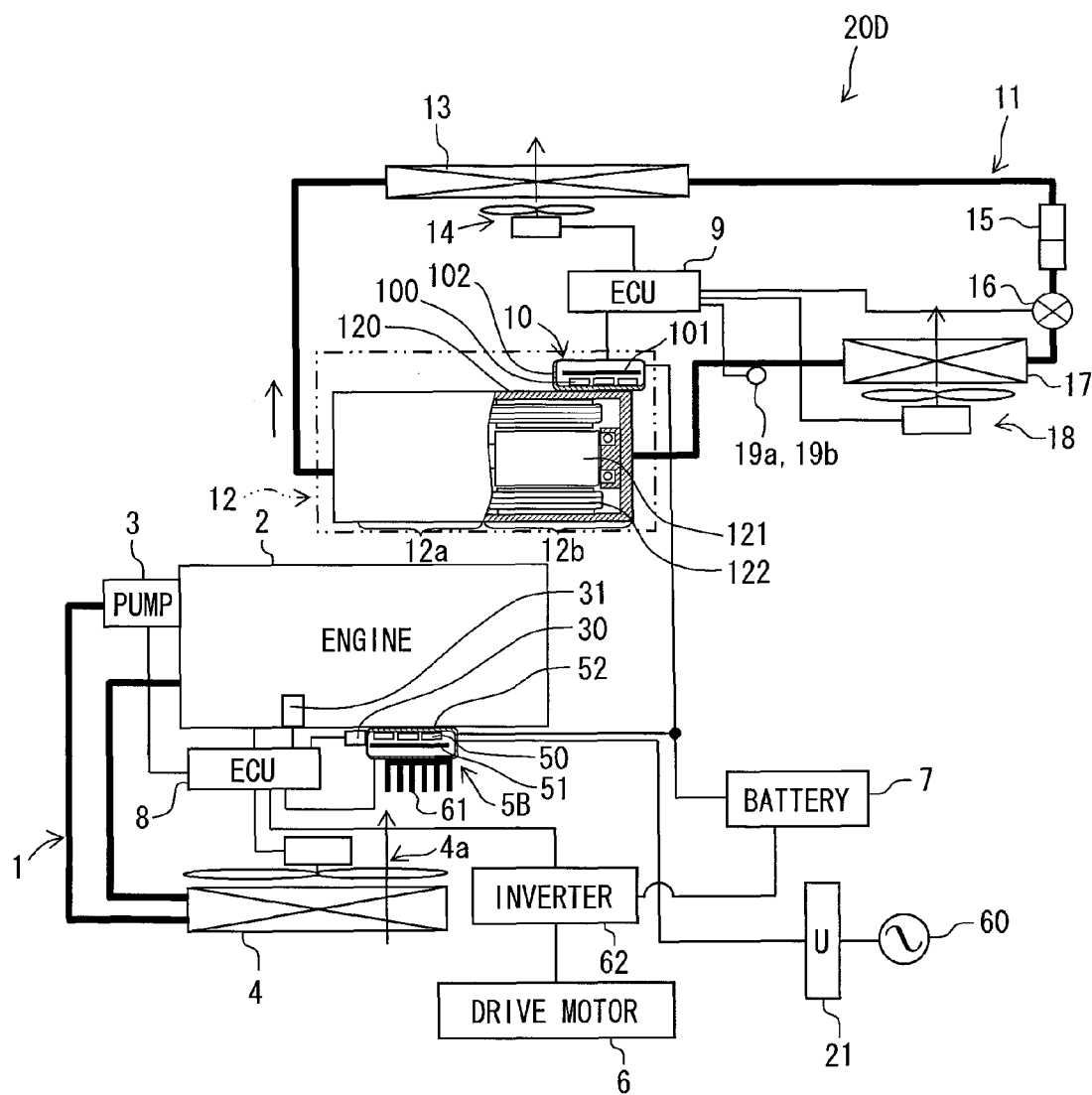
FIG. 16 is a schematic chart showing a battery charging apparatus according to a seventh embodiment.

A seventh embodiment is a modification of the first embodiment. FIG. 16 is a schematic chart showing a battery charging apparatus 20D according to the seventh embodiment. In the battery charging apparatus 20D shown in FIG. 16, a battery charger 5B has a plurality of fins 61 for heat-radiating. Configurations different from the first embodiment will be described below.

As shown in FIG. 16, the battery charger 5B has the fins 61 on the case 52. The fins 61 is arranged in such a manner as to receive cooling air from the radiator fan 4a. Specifically, the fins 61 are fixed on the case 52, or the fins 61 and the case 52 are integrally formed. The case 52 and the fins 61 are made of heat-conductive material, such as aluminum, copper and iron. Thus, thermal resistance between the case 52 and the fins 61 is decreased. The heat generated by the battery charger 5B is transferred to the fins 61 through the case 52 of a battery charger 5B.

In a case that the fins 61 and the case 52 are formed separate pieces, heat conduction grease may be pasted therebetween to improve thermal conductivity.

When the cooling temperature condition is satisfied, the radiator fan 4a supplies cooling air toward the drive motor 40 and the engine 2. Thereby, the heat radiation from the fins 61 is expedited.

Moreover, in addition to driving the radiator fan 4a, the water pump 3 may be driven to circulate the coolant.

Advantages of the battery charging apparatus 20D of present embodiment will be described hereinafter. In the battery charging apparatus 20D, the battery charger 5B has fins 61 for heat-radiating. The fins 61 is arranged in such a manner as to receive cooling air from the radiator fan 4a.

The fins 61 can increase a heat radiating area of the battery charger 5B and can reduce the thermal resistance between a battery charger 5B and ambient air. Furthermore, the cooling air from the radiator fan 4a flows to the fins 61, whereby the heat radiation from the fins 61 is expedited. Thus, the IGBT is efficiently cooled.

Eighth Embodiment

Figure 17:
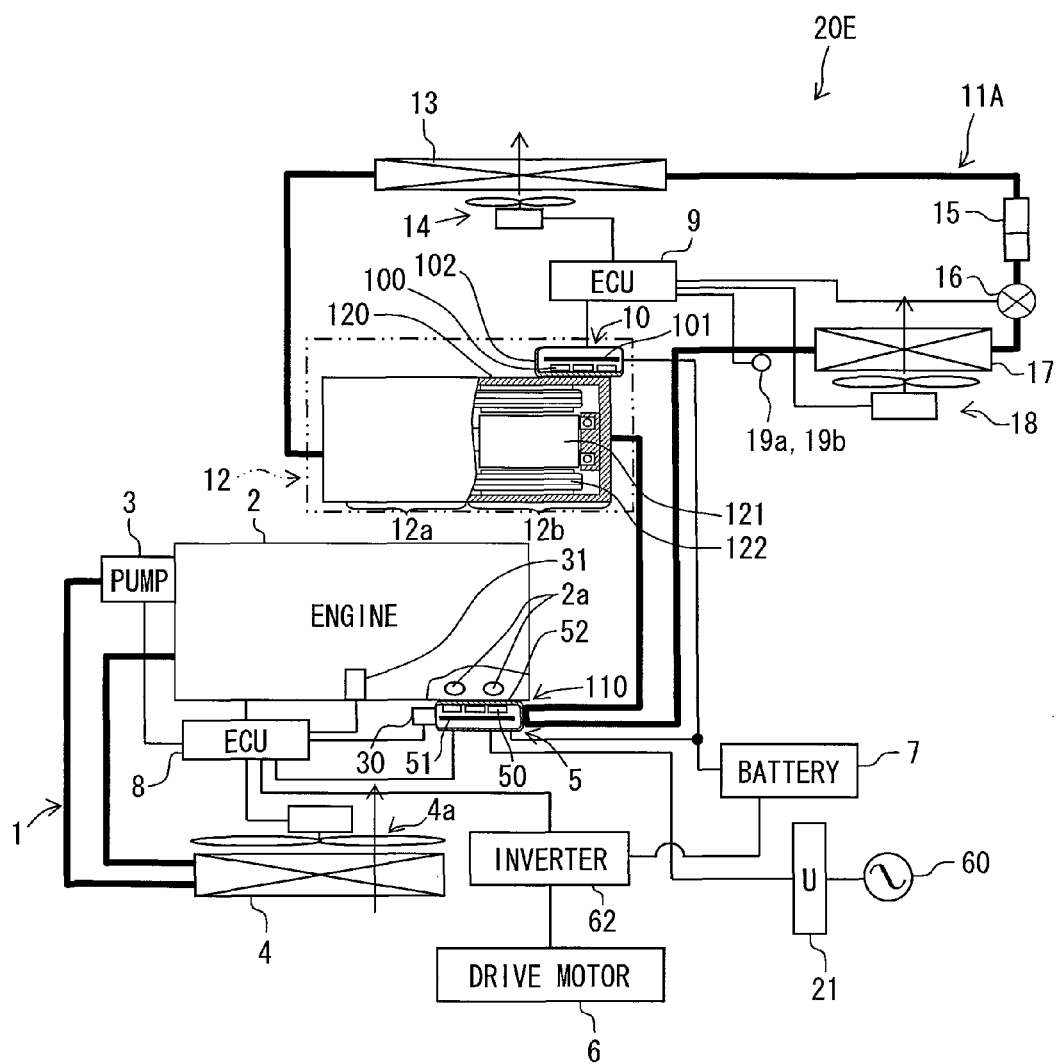
FIG. 17 is a schematic chart showing a battery charging apparatus according to an eighth embodiment.

An eighth embodiment is a modification of the first embodiment. FIG. 17 is a schematic chart showing a battery charging apparatus 20E according to the eighth embodiment. In the battery charging apparatus 20E shown in FIG. 17, the battery charger is configured integrally with the engine 2. Configurations different from the first embodiment will be described below.

As shown in FIG. 17, the battery charger 5 is disposed on the exterior case of the engine 2 at a position corresponding to a coolant passage 2a. That is, at least a part of coolant passage 2a is formed in the engine 2 in such a manner as to confront the case 52 of a battery charger 5 through the exterior case of the engine 2. According to the above configuration, heat generated by the battery charger 5 is transferred to the engine coolant in the coolant passage 2a through the case 52 of a battery charger 5 and the exterior case of the engine 2.

In the battery charging apparatus 20E, the battery charger 5 is disposed on the exterior case of the engine 2 at a position corresponding to a coolant passage 2a, so that the generated heat can be transferred therebetween.

In the heat radiation path from the battery charger 5 through the engine 2, the thermal resistance can be reduced. Thus, the IGBT can be effectively cooled.

Ninth Embodiment

Figure 18:
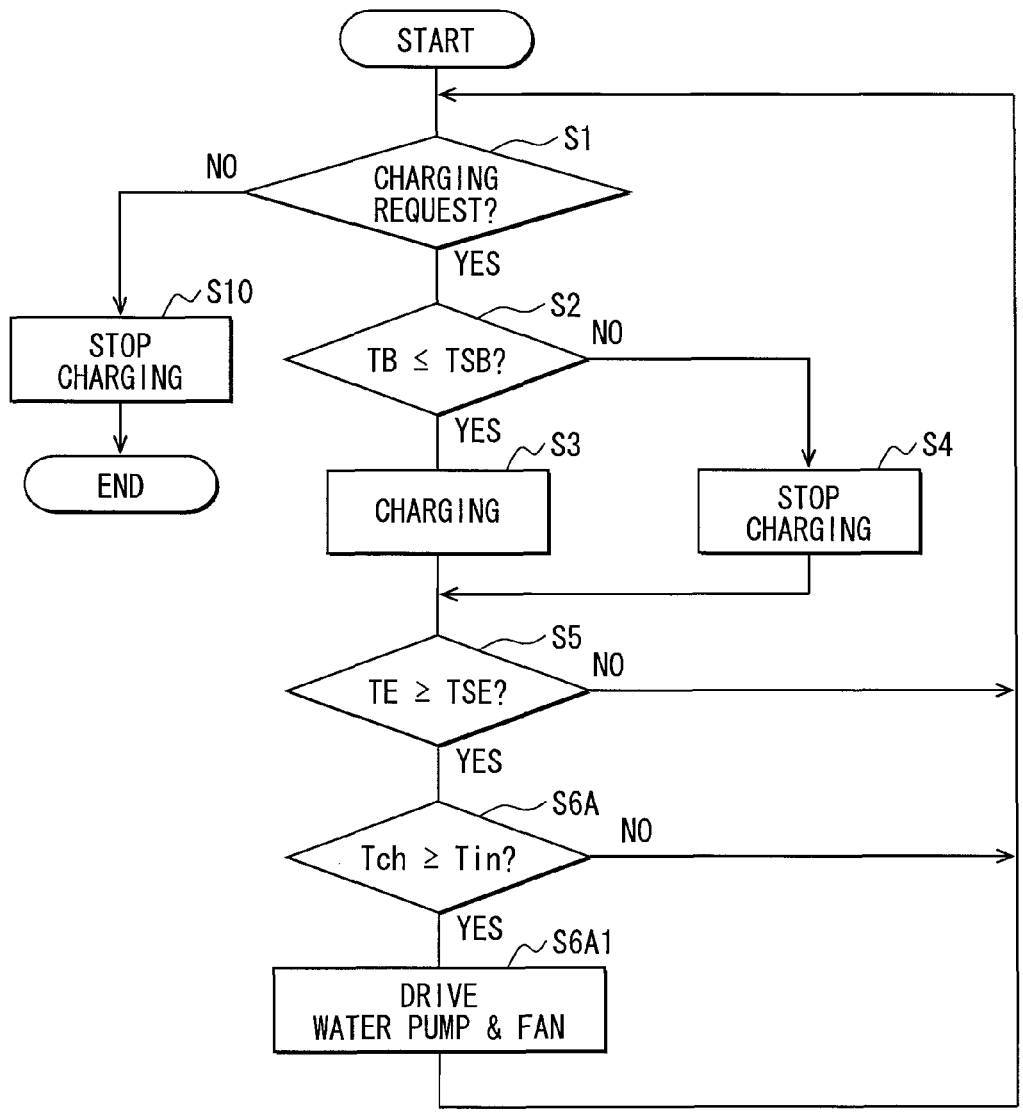
FIG. 18 is a flowchart showing a cooling control of the battery charger according to a ninth embodiment.

A ninth embodiment is a modification of the first embodiment. FIG. 18 is a flowchart showing the cooling control of the battery charger 5 according to the ninth embodiment. In the flowchart shown in FIG. 18, step 6A and step 6A1 are different from the flowchart shown in FIG. 2. Referring to FIG. 18, the cooling control of the battery charger 5 will be described hereinafter. Only processings different from the first embodiment will be described.

When the answer is YES (TE≥TSE) in step 5, the procedure proceeds to step 6A in which the computer determines whether a charging execution time (Tch) for charging the storage battery 7 is longer than a temperature increasing time (Tin) which is required for the temperature TB to increase up to the temperature TSB. The charging execution time Tch is computed based on a scheduled time at which the vehicle starts to run or a charging-termination scheduled time at which the charging operation is terminated. The scheduled time and the charging-termination scheduled time are determined based on command signals from a user and the ECU 8.

The temperature increasing time Tin corresponds to a time period in which the temperature TI increases up to the upper limit temperature (for example, 125° C.). The temperature increasing time Tin is obtained by using of a temperature increasing computing map which defines a relation between the temperature TB and the elapsed time. The temperature increasing computing map is previously stored in the ROM and/or the RAM.

When the answer is YES in step 6A, the procedure proceeds to step 6A1 in which the water pump 3 and the radiator fan 4a are driven to cool the drive motor 40 or the engine 2. The heat of IGBT transferred to the case 52 of a battery charger 5 is radiated by cooling the drive motor 40 or the engine 2. When the answer is NO in step 6A, the procedure goes back to step 1. Moreover, in step 6A1, the drive motor 40 and the engine 2 or the battery charger 5 may be cooled by only air generated by the radiator fan 4a.

For example, in a case that the engine 2 is cooled and the charging operation of the storage battery 7 is terminated immediately after the charging operation is started in order to start the vehicle, it is necessary to avoid the warming of the engine 2. According to the above configuration, the cooling operation of the engine 2 is not conducted until the temperature TB increases up to the temperature TSB, whereby unnecessary cooling of the engine 2 can be restricted. Thus, the energy of the vehicle can be effectively utilized.

Tenth Embodiment

Figure 19:
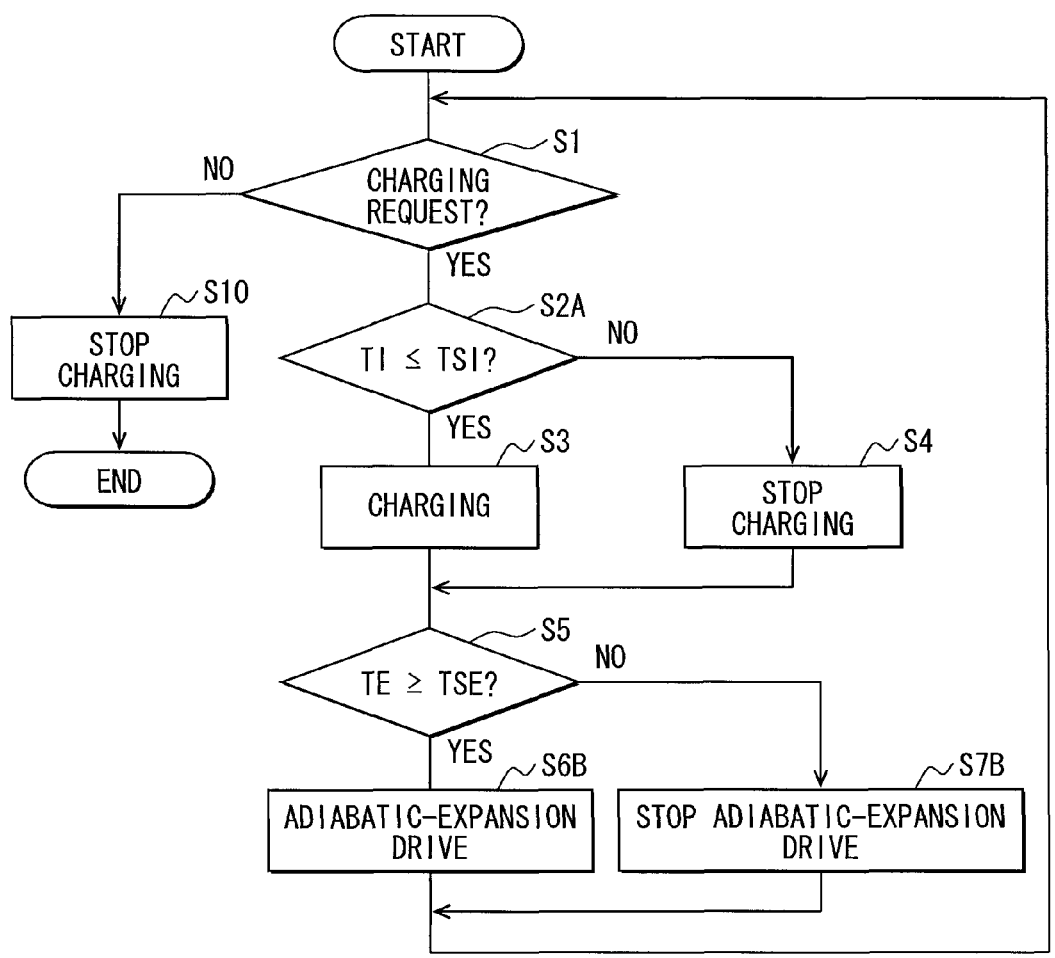
FIG. 19 is a flowchart showing a cooling control of the battery charger according to a tenth embodiment.

A tenth embodiment is a modification of the first embodiment. FIG. 19 is a flowchart showing the cooling control of the battery charger 5 according to the tenth embodiment. In the flowchart shown in FIG. 19, step 2A, step 6B and step 7B are different from the flowchart shown in FIG. 2. Referring to FIG. 19, the cooling control of the battery charger 5 will be described hereinafter. Only processings different from the first embodiment will be described.

When the computer determines that a charging request is generated in step 1, the procedure proceeds to step 2A in which the temperature of IGBT (switching element 50) is lower than or equal to a specified temperature TSI. The specified temperature TSI is 125° C., for example. The temperature of IGBT is referred to as a temperature TI. The upper limit temperature TI is lower than or equal to 125° C. When the answer is YES in step 2A, the computer determines that a heat generating condition of the IGBT has no problem.

When the answer is NO in step 2A, the procedure proceeds to step 3 in which the charging operation is executed. Meanwhile, when the answer is NO in step 2A, it is assumed that the IGBT should be cooled before the charging operation is executed. The procedure proceeds to step 4 in which the charging operation is terminated.

When the answer is YES (TE≥TSE) in step 5, the procedure proceeds to step 6B in which the driving condition of the engine 2 is brought into an adiabatic-expansion drive. When the answer is NO (TE<TSE) in step 5, the procedure proceeds to step 7B in which the adiabatic-expansion drive is stopped.

The ECU 8 makes the engine 2 idling by using of the drive motor 40 in a condition where no fuel injection and no ignition are conducted. Especially, in step 6B, an intake valve and an exhaust valve are closed and the piston is slid down, whereby an adiabatic expansion occurs in a cylinder and air temperature in the cylinder falls. This control is referred to as adiabatic-expansion drive. Meanwhile, in step 7B, the sliding movement of the piston is stopped to terminate the adiabatic-expansion stop.

As above, the adiabatic-expansion drive is conducted so that the temperature in the cylinder is decreased to cool the exterior case of the engine 2. Thus, the heat is transferred from the battery charger 5 to the engine 2, whereby the IGBT can be effectively cooled.

Eleventh Embodiment

Figure 20:
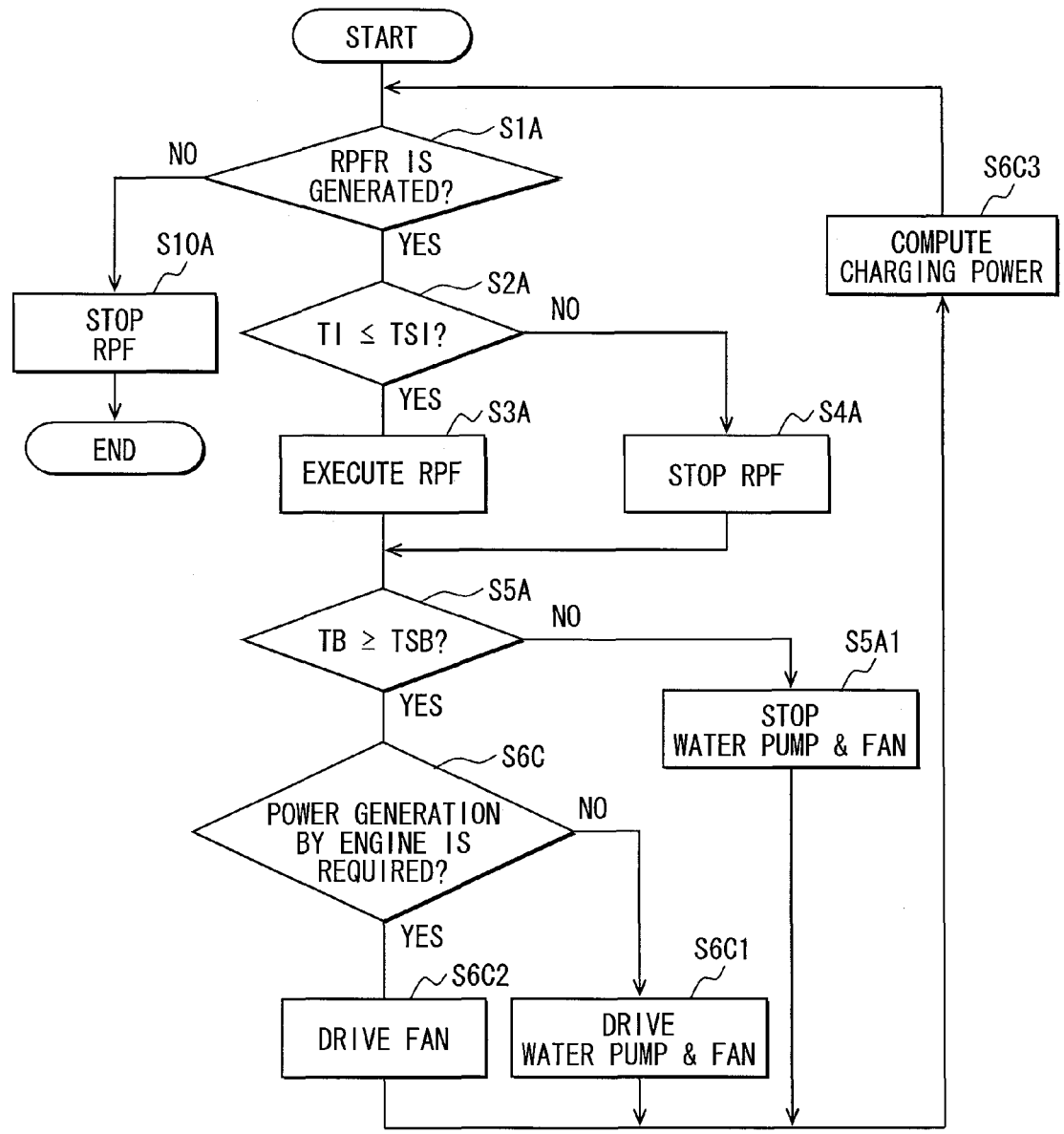
FIG. 20 is a flowchart showing a cooling control of the battery charger according to an eleventh embodiment.
Figure 21:
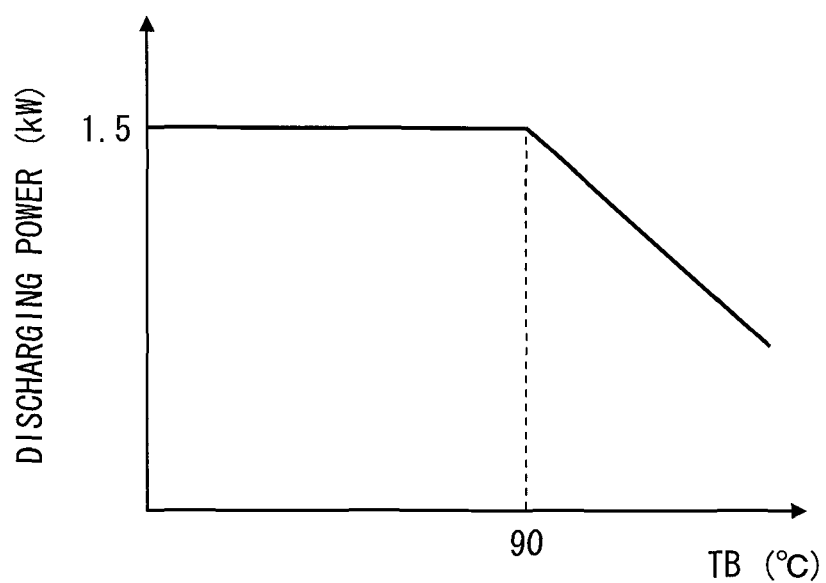
FIG. 21 is a charging-power computation map which is used in step 6C3 of FIG. 20.

An eleventh embodiment is a modification of the first embodiment. FIG. 20 is a flowchart showing the cooling control of the battery charger 5 according to the eleventh embodiment. FIG. 21 shows a charging-power computation map which is used in step 6C3 of FIG. 20. In the cooling control shown in FIG. 20, even if an electric discharge requirement (reverse-power-flow requirement) of the storage battery 7 is generated, the cooling of the storage battery 7 is conducted.

Referring to FIGS. 20 and 21, the cooling control of the battery charger 5 will be described hereinafter. Configurations different from the first embodiment will be described below.

In step 1A, the computer determines whether the reverse-power-flow requirement (RPFR) is generated. When the computer determines that the RPFR is generated in step 1, the procedure proceeds to step 2A in which the computer determines whether the temperature of IGBT (switching element 50) is lower than or equal to a specified temperature TSI. The specified temperature TSI is 125° C., for example. The temperature of IGBT is referred to as a temperature TI. The upper limit temperature TI is lower than or equal to 125° C. When the answer is YES in step 2A, the computer determines that a heat generating condition of the IGBT has no problem so that the reverse-power-flow can be conducted.

When the answer is YES in step 2A, the procedure proceeds to step 3A in which the reverse-power-flow (RPF) is executed to discharge the storage battery 7. Meanwhile, when the answer is NO in step 2A, it is assumed that the IGBT should be cooled before the discharging operation is executed. The procedure proceeds to step 4A in which the reverse-power-flow operation is terminated.

In step 5A, the computer determines whether temperature of the exterior case 52 of the battery charger 5 is greater than or equal to the specified temperature TSB. The temperature of the exterior case 52 of the battery charger 5 corresponds to the temperature TB. The temperature TB is detected by the first temperature sensor 30, and the specified value TSB is 80° C., for example.

When temperature TB is less than 80° C., it is assumed that the temperature TI is less than 125° C. and the computer determines that a heat generating condition of the IGBT has no problem. When the temperature TB is not less than 80° C., it is assumed that the temperature TI is 125° C. or more. If the temperature TB is not less than 80° C., the computer determines that the IGBT should be cooled.

When the answer is YES in step 5A, the procedure proceeds to step 6C in which the computer determines whether a power generation by the engine 2 is required. When the answer is YES in step 6C, the procedure proceeds to step 6C2 in which the radiator fan 4a is driven without driving the water pump 3. The heat of IGBT transferred to the exterior case of the engine 2 and the case 52 of a battery charger 5 is radiated to outside air supplied from the radiator fan 4a.

When the answer is NO in step 6C, the engine 2 has no problem to be cooled. The procedure proceeds to step 6C1 in which the water pump 3 and the radiator fan 4a are driven to cool the engine 2 and the battery charger 5. The heat of IGBT transferred to the exterior case of the engine 2 through the case 52 of a battery charger 5 is transferred to the engine coolant and is radiated to outside air by the radiator 4.

When the answer is YES in step 5A, it is unnecessary to cool the engine 2 and the battery charger 5. The procedure proceeds to step 5A1 in which the water pump 3 and the radiator fan 4a are turned off.

After step 5A1, step 6C1 or step 6C2, the procedure proceeds to step 6C3 in which a discharge power is computed according to a discharging-power computation map shown in FIG. 21. In step 6C3, the discharging power is computed based on the temperature TB detected by the first temperature sensor 30 according to the discharging-power computation map. For example, when the temperature TB is lower than or equal to 90° C., the discharging power is set to 1.5 kW. When the temperature TB exceeds 90° C., the discharging power is linearly decreased.

After step 6C3, the procedure goes back to step 1A. When the answer is NO in step 1A, the procedure proceeds to step 10A in which the reverse-power-flow (RPF) is terminated. As described above, while the discharging operation is performed or before the discharging operation is performed, if the temperature TB is high, the engine 2 is cooled. Moreover, in the cooling control of the battery charger 5, until the answer becomes NO in step 1A, the temperature TB are monitored and the temperature of IGBT is controlled.

Moreover, when the cooling temperature condition is satisfied, the computer determines whether the engine 2 should be cooled according to whether the power generation by the engine 2 is required. Thereby, the battery charger 5 can charge the storage battery 7 without deteriorating a driving efficiency of the engine 2, so that the energy can be effectively utilized.

Other Embodiment

The preferred embodiments are described above. The present disclosure is not limited to the above embodiments.

In each embodiment, the flow of coolant in the cooling system is controlled by a thermo valve or an electromagnetic valve.

In each embodiment, electric parts other than switching elements 50 can be cooled.

In the above embodiments, when the compressor 12 is driven, the condenser fan 14 is also driven. However, the condenser fan 14 is not always driven according to the ambient temperature.

The electrically-driven compressor 12 may be a piston-type compressor or a rotary-type compressor.

In the refrigerant cycles 11 and 11A, the receiver 15 is not always necessary. Besides, the receiver 15 may be integrated with the condenser 13.

What is claimed is:

1. A battery charging apparatus for a vehicle, comprising;
   a drive motor for driving the vehicle;
   an internal combustion engine for driving the vehicle, the internal combustion engine including an exterior case;
   a storage battery charging an utility power for supplying an electric power to the drive motor;
   a battery charger controlling a power charging to the storage battery, the battery charger including a battery charger case;
   a cooling system for cooling the engine; and
   an electronic control unit controlling the cooling system: wherein
   the drive motor receives the electric power from an inverter unit other than the battery charger;
   the cooling system includes a coolant circuit through which a coolant circulates to cool the engine, a radiator performing a heat exchange between the coolant and air, and a fan for supplying the air toward the radiator;
   the battery charger case is mounted to the exterior case in such a manner that a generated heat in the battery charger is transferred to the internal combustion engine through the battery charger case and the exterior case; and
   when a charging request of storage battery is generated and when an engine temperature or a battery charger temperature is greater than or equal to a specified temperature which is lower than a temperature necessary for cooling the battery charger during a charging or before starting the charging, the electronic control unit drives the fan for supplying the air toward the radiator or the engine so as to cool the battery charger.

2. A battery charging apparatus for a vehicle according to claim 1, further comprising:
a refrigerant cycle having a compressor, a condenser, a pressure reducer and an evaporator; wherein
the exterior case is integrated with the battery charger case;
the exterior case is arranged in such a manner that the generated heat is transferred between the exterior case and a low-pressure portion of the refrigerant cycle; and
when an drive motor temperature or a battery charger temperature is greater than or equal to a specified temperature which is lower than a temperature necessary for cooling the battery charger during a charging or before starting the charging, the electronic control unit drives the refrigerant cycle.

3. A battery charging apparatus for a vehicle according to claim 1, further comprising:
a refrigerant cycle having a compressor, a condenser, a pressure reducer and an evaporator; wherein
the exterior case is integrated with the battery charger case;
the exterior case is arranged in such a manner that the generated heat is transferred between the exterior case and a low-pressure portion of the refrigerant cycle; and
the electronic control unit operates the refrigerant cycle when the electronic control unit determines that the engine needs to be further cooled even though the cooling system is operated.

4. A battery charging apparatus for a vehicle according to claim 1, further comprising:
a refrigerant cycle having an electrically-driven compressor, a condenser, a pressure reducer and an evaporator, wherein
the electrically-driven compressor is disposed on the exterior case in such a manner that a generated heat is transferred therebetween;
the battery charger has an inverter which controls the electrically-driven compressor, the battery charger is integrated with the electrically-driven compressor;
a charging operation of the battery charger and an operation of the refrigerant cycle are conducted independently; and
the battery charger charges the storage battery with an electric power which is controlled based on a temperature of the battery charger or a temperature relating to the temperature of the battery charger.

5. A battery charging apparatus according to claim 1, wherein
the battery charger is disposed on the exterior case at a position corresponding to a coolant passage in such a manner that the generated heat is transferred between the battery charger and the exterior case.

6. A battery charging apparatus for a vehicle, comprising;
a drive motor for driving the vehicle;
an internal combustion engine for driving the vehicle, the internal combustion engine including an exterior case;
a storage battery charging an utility power for supplying an electric power to the drive motor;
a battery charger controlling a power charging to the storage battery, the battery charger including a battery charger case;
a cooling system for cooling the drive motor; and
an electronic control unit controlling the cooling system; wherein:
the drive motor receives the electric power from an inverter unit other than the battery charger;
the cooling system includes a coolant circuit through which a coolant circulates to cool the drive motor, a radiator performing a heat exchange between the coolant and air, and a fan for supplying the air toward the radiator;
the battery charger case is mounted to the exterior case in such a manner that a generated heat in the battery charger is transferred to the internal combustion engine through the battery charger case and the exterior case; and
when a charging request of storage battery is generated and when an drive motor temperature or a battery charger temperature is greater than or equal to a specified temperature which is lower than a temperature necessary for cooling the battery charger during a charging or before starting the charging, the electronic control unit drives the fan for supplying the air toward the radiator or the drive motor so as to cool the battery charger.

7. A battery charging apparatus for a vehicle according to claim 6, further comprising:
a refrigerant cycle having a compressor, a condenser, a pressure reducer and an evaporator; wherein
the exterior case is integrated with the battery charger case;
the exterior case is arranged in such a manner that the generated heat is transferred between the exterior case and a low-pressure portion of the refrigerant cycle; and
when an drive motor temperature or a battery charger temperature is greater than or equal to a specified temperature which is lower than a temperature necessary for cooling the battery charger during a charging or before starting the charging, the electronic control unit drives the refrigerant cycle.

8. A battery charging apparatus for a vehicle according to claim 6, further comprising:
a refrigerant cycle having a compressor, a condenser, a pressure reducer and an evaporator; wherein
the drive motor has a drive motor case integrated with the battery charger case; the drive motor case is arranged in such a manner that the generated heat is transferred between the exterior case and a low-pressure portion of the refrigerant cycle; and
the electronic control unit operates the refrigerant cycle when the electronic control unit determines that the drive motor needs to be further cooled even though the cooling system is operated.

9. A battery charging apparatus for a vehicle according to claim 6, further comprising:
a refrigerant cycle having an electrically-driven compressor, a condenser, a pressure reducer and an evaporator; wherein
the electrically-driven compressor is disposed on a drive motor case of the drive motor in such a manner that a generated heat is transferred therebetween;
the battery charger has an inverter which controls the electrically-driven compressor;
the battery charger is integrated with the electrically-driven compressor;
a charging operation of the battery charger and an operation of the refrigerant cycle are conducted independently; and
the battery charger charges the storage battery with an electric power which is controlled based on a temperature of the battery charger or a temperature relating to the temperature of the battery charger.

10. A battery charging apparatus for a vehicle, comprising;
a drive motor for driving the vehicle;

an internal combustion engine for driving the vehicle, the internal combustion engine including an exterior case;

a storage battery charging an utility power for supplying an electric power to the drive motor;

a battery charger controlling a power charging to the storage battery, the battery charger including a battery charger case;

a cooling system for cooling the engine; and an electronic control unit controlling the cooling system; wherein:

the battery charger case is mounted to the exterior case in such a manner that a generated heat in the battery charger is transferred to the internal combustion engine through the battery charger case and the exterior case; and the electronic control unit drives the cooling system for cooling the engine when a temperature of the engine or a temperature of the battery charger satisfies a predetermined cooling temperature condition;

when a charging request is generated by a user of the vehicle, the control unit computes a charging execution time, which is required for charging the storage battery, based on a scheduled time at which the vehicle starts to run or a charging-termination scheduled time at which a charging operation is terminated, the electronic control unit computes a temperature increasing time which is required for increasing the temperature of the battery charger up to a specified temperature; and when the charging execution time is longer than the temperature increasing time, the electronic control unit drives the cooling system.

* * * * *